US010235619B2

(12) United States Patent
Edwards et al.

(10) Patent No.: US 10,235,619 B2
(45) Date of Patent: Mar. 19, 2019

(54) SYSTEMS AND METHODS FOR CAPTURING VISIBLE INFORMATION

(71) Applicant: Capital One Services, LLC, McLean, VA (US)

(72) Inventors: Joshua Edwards, Philadelphia, PA (US); Jiawei Zhao, Ashburn, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 15/874,600

(22) Filed: Jan. 18, 2018

(65) Prior Publication Data

US 2018/0260679 A1    Sep. 13, 2018

Related U.S. Application Data

(63) Continuation of application No. 15/832,333, filed on Dec. 5, 2017, which is a continuation-in-part of application No. 15/706,312, filed on Sep. 15, 2017, which is a continuation of application No. 15/702,213, filed on Sep. 12, 2017.

(60) Provisional application No. 62/470,053, filed on Mar. 10, 2017.

(51) Int. Cl.
*G06K 19/18* (2006.01)
*G06Q 20/34* (2012.01)
*G06K 19/16* (2006.01)
*G06K 19/07* (2006.01)

(52) U.S. Cl.
CPC ......... *G06K 19/18* (2013.01); *G06Q 20/3567* (2013.01); *G06K 19/0725* (2013.01); *G06K 19/16* (2013.01); *G06T 2210/32* (2013.01)

(58) Field of Classification Search
CPC .... G06K 19/18; G06K 19/16; G06K 19/0725; G06Q 20/3567; G06T 2210/32
See application file for complete search history.

(56) References Cited

U.S. PATENT DOCUMENTS

| 7,815,124 | B2 | 10/2010 | Schneck et al. |
| 8,542,889 | B2 | 9/2013 | Sarnoff |
| 8,941,741 | B1 | 1/2015 | McDonough et al. |
| 9,563,926 | B2 | 2/2017 | Avni et al. |

(Continued)

*Primary Examiner* — Daniel A Hess
(74) *Attorney, Agent, or Firm* — Finnegan, Henderson, Farabow, Garrett & Dunner, LLP

(57) ABSTRACT

A transaction card construction and computer-implemented methods for a transaction card are described. The transaction card has vector-formatted visible information applied by a laser machining system. In some embodiments, systems and methods are disclosed for enabling the sourcing of visible information using a scalable vector format. The systems and methods may receive a request to add visible information to a transaction card and capture an image of the visible information. The systems and methods may capture data representing the image. The systems and methods may also determine an ambient color saturation of the image. Further, systems and methods may translate the image based on the ambient color saturation of the image. The systems and methods may also map the translated image to a bounding box and convert the mapped image into vector format. In addition, the systems and methods may provide the converted image to a laser machining system.

19 Claims, 10 Drawing Sheets

(56) References Cited

U.S. PATENT DOCUMENTS

| | | | |
|---|---|---|---|
| 2007/0016785 A1* | 1/2007 | Guay | H04L 9/3236 713/176 |
| 2009/0315318 A1* | 12/2009 | Jones | B42D 25/00 283/85 |
| 2016/0224962 A1 | 8/2016 | Herwig | |
| 2017/0372455 A1* | 12/2017 | Winnemoeller | G06T 5/003 |

* cited by examiner

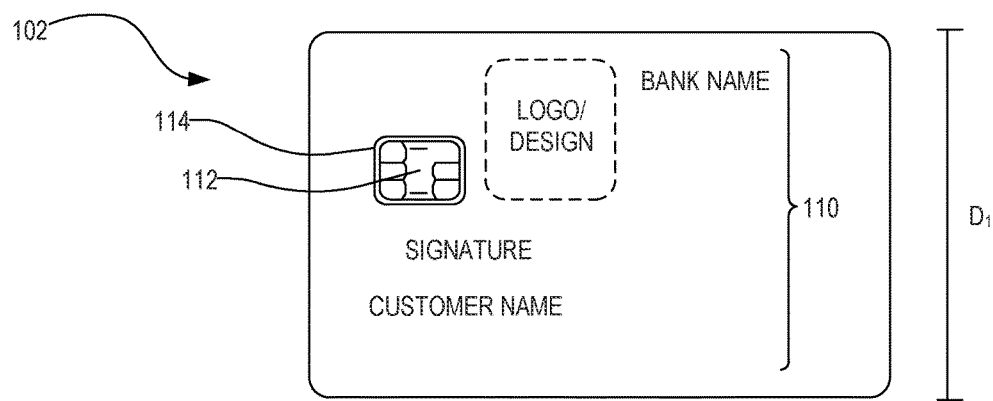
FIG. 1A
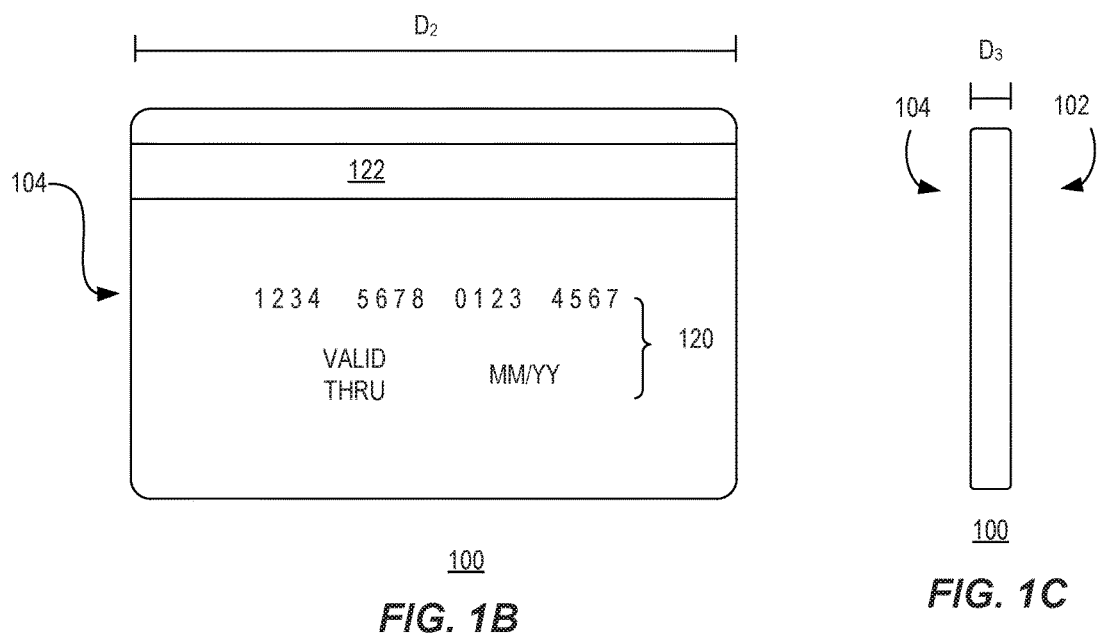
FIG. 1B
FIG. 1C

SYSTEMS AND METHODS FOR CAPTURING VISIBLE INFORMATION

CROSS-REFERENCE TO RELATED APPLICATIONS

This application is a continuation of U.S. patent application Ser. No. 15/832,333, filed Dec. 5, 2017, which is a continuation-in-part of U.S. patent application Ser. No. 15/706,312, filed on Sep. 15, 2017, which claims priority to U.S. patent application Ser. No. 15/702,213, filed on Sep. 12, 2017, which claims priority to U.S. Provisional Application No. 62/470,053, filed on Mar. 10, 2017. The contents of the above-referenced applications are expressly incorporated herein by reference in their entireties.

TECHNICAL FIELD

The disclosed embodiments generally relate to the capturing of images and laser rendering of images on transaction cards using a vector image format. The disclosed embodiments also generally relate to electronically verifying visible information entered into a point-of-service terminal with a scalable vector image file representing the visible information stored for a transaction card.

BACKGROUND

Transaction cards, such as credit and debit cards, have become a primary means for individuals to complete transactions involving data exchange. Traditional transaction cards are constructed in a sheeted laminate press. The shape of the card is die cut, and then, the card is personalized. Typically, transaction cards are cut from laminated sheets of polyvinyl chloride (PVC), polycarbonate (PC), or other similar materials. After the overall shape of the card is formed, the card may be modified to add functional and/or visible features. For example, a magnetic stripe and/or microchip may be affixed to one side, the card may be stamped with the card number and customer name, and color(s) or a design may be added for appearance.

As a fraud prevention measure, such cards may be provided with a signature specimen, such that a vendor relying on the card for some aspect of a transaction, can authenticate that the person presenting the card is the actual authorized user of the card based on a comparison of a fresh signature provided at presentation with a signature specimen available on the card. Traditional signature specimens are placed on the card by the card user when the card user initially receives the card. Such timing, however, can allow an illicit recipient to place a fraudulent signature specimen on the card, for fraudulent presentment later. Receiving a signature specimen from a card user prior to issuance of the card, and forming an image of the signature on the card prior to delivery to the card user, may preclude an illicit recipient from being able to create a fraudulent signature specimen.

Traditional card manufacturing methods continue to utilize techniques and materials that restrict variations in card style and appearance. One limitation of traditional transaction cards involves the quality of both printed and stored visible information, such as the customer's signature, name, or the like. For example, current techniques that place a signature specimen on a card by a card fabricator provide poor quality because these techniques utilize digitized image formats (also referred to as bitmaps), raster files, or flat image files (e.g., Portable Network Graphics (PNG) or Joint Photographic Experts Group (JPEG) formats). Digitized image formats, raster files, and flat files form an image by using a representative matrix of black and/or white dots (or colored dots in a color image), where each dot at a specific position within the matrix is black, white, or a color, dependent on the image. Such matrices allow for image representation at high resolutions, to avoid visible "blockiness." However, higher resolutions increase data and processing requirements, and may be beyond the capabilities of image fixing processes, such as matrix printing or forming processes. Furthermore, some forming methods do not utilize a matrixed-image-generation process, but rather a continuous-element process, which utilizes continuous motion of a generating tool, such as an laser machining system, where the use of a bitmap or flat image would require conversion to vectored motion instructions for the image generating tool. Thus, these flat image formats do not maximize the ability of a laser machining system (i.e., laser machine) to etch higher resolution images. When flat image formats are used, laser machining systems approximate the boundaries of an image, which often leads to etching lower quality images due to problems, such as aliasing problems. This approximation leads to lower quality images with more blur, less smooth motions, more pixilation, less sharpness, less fidelity, etc. Furthermore, lower image quality of a signature specimen can also decrease fraud prevention and security protections due to the signature specimen having a lower comparability to an actual signature.

In addition, as transaction cards increase in prevalence, consumer expectations for transaction card quality have increased. Transaction cards have increasingly been made to meet higher standards regarding materials, durability, security, and appearance. Decreased image quality negatively impacts the ability for transaction card manufacturers to meet these higher standards.

The present disclosure is directed to improvements in transaction cards. Specifically, the present disclosure is directed to increasing the fidelity of visible information on transaction cards by employing a visible information engine.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments generally relate to a process/method and system for the capturing of images and laser etching of the captured images onto transaction cards using a vector image format. The disclosed embodiments also generally relate to electronically verifying visible information entered into a point-of-service terminal with a scalable vector image file representing the visible information stored for a transaction card.

Certain disclosed embodiments provide systems and computer-implemented methods for the sourcing of visible information using a scalable vector format. For example, the method may include the step of receiving a request to add a first plurality of visible information. The method may also include the step of capturing an image of the first plurality of visible information. The method may further include the step of mapping the image of the first plurality of visible information to a bounding box. The method may also include the step of converting the image into a vector format. Even further, the method may include the step of providing the converted image to a laser machine, wherein providing the converted image causes the laser machining system to modify a card to include the converted image.

Moreover, certain disclosed embodiments provide other systems and computer-implemented methods for the sourcing of visible information using a scalable vector format. For example, the method may include the step of capturing data representing a first image of visible information, the first image comprising a plurality of pixels, the pixels being represented in the data by color information values. The method may also include the step of determining a first ambient color saturation of the first image, the first ambient color saturation being represented by a color information value. The method may further include the step of translating the data representing the first image to data representing a first translated image by translating the color information values of the pixels, the pixels being translated based on whether the color information values of the pixels exceed the color information value of the first ambient color saturation. In addition, the method may include the step of storing, in a customer authentication database, the data representing the first translated image based on a determination that the customer approves of the visible information.

In addition, certain embodiments disclosed embodiments provide other systems and computer-implemented methods for the sourcing of visible information using a scalable vector format. For example, the method may include the step of capturing data representing a first image of a first signature, the first image comprising a first pixel and a second pixel, the first pixel being represented in the data by a first color information value, and the second pixel being represented in the data by a second color information value. The method may also include the step of determining an ambient color saturation of the first image, the ambient color saturation being represented by a third color information value that is the average of the first and second color information values. In addition, the method may include the step of translating the data representing the first image to data representing a first translated image by determining whether the first color information value is darker than the third color information value, wherein: translating the data representing the first image to data representing a first translated image by determining whether the first color information value is darker than the third color information value, wherein: setting the color information value of the first pixel to a color information value of a first color; and in response to determining that the first color information value is not darker than the third color information value: setting the color information value of the first pixel to a color information value of a second color. Further, the method may include storing, in a customer authentication database, the data representing the first translated image based on a determination that a customer associated with the first image approves of the visible information.

Also, certain disclosed embodiments provide other systems and computer-implemented methods for the sourcing of visible information using a scalable vector format. For example, the method may include the step of receiving a request to add first visible information to a transaction card. The method may also include the step of capturing data representing a first image of the first visible information, the first image comprising a plurality of pixels represented by color information values. In addition, the method may include the step of determining an ambient color saturation of the first image, the ambient color saturation being represented by a color information value. The method may further include the step of translating the data representing the first image by translating the color information values of the pixels, the pixels being translated based on whether the color information value of the pixels exceed the color information value of the first ambient color saturation. The method may also include the step of mapping the data representing the translated image to a bounding box. Further, the method may include the step of converting the data representing the mapped image into a vector format. Even further, the method may include the step of providing the data representing the converted image data to a laser machining system.

Additionally, certain disclosed embodiments provide other systems and computer-implemented methods for the sourcing of visible information using a scalable vector format. For example, the method may include the step of capturing data representing a first image of visible information, the first image comprising a first plurality of pixels, the pixels represented in the data by color information values. The method may also include the step of determining a background color of the first image by finding a first most common color among the first plurality of pixels, the background color represented by a color information value. Further, the method may include the step of determining a first pixel in the first plurality of pixels within a first threshold of the background color. In addition, the method may include the step of translating the data representing the first image to data representing a first translated image by setting the color information value for the first pixel to a first color. The method may further include the step of determining a second color of the translated first image by finding a second most common color among the first plurality of pixels. Further, the method may include the step of storing, in a customer authentication database, the data representing the first translated image based on a determination that a customer associated with the first image approves of the visible information.

Further, certain disclosed embodiments provide other systems and computer-implemented methods for the sourcing of visible information using a scalable vector format. For example, the method may include the step of capturing data representing a first image of a first signature, the first image comprising a first pixel and a second pixel, the first pixel being represented in the data by a first color information value, and the second pixel being represented in the data by a second color information value. The method may further include the step of determining a background color of the first image, the background color being represented by a third color information value. The method may also include the step of determining whether a first pixel in the first plurality of pixels is within a first threshold of the background color. Additionally, the method may include the step of in response to determining that the first pixel is within the first threshold of the background color: storing the first pixel in a second plurality of pixels; determining a second threshold by incrementing the first threshold with a predetermined value; and in response to determining that the second pixel in the first plurality of pixels is within a second threshold, storing the second pixel in the second plurality of pixels. Further, the method may include the step of translating the data representing the first image to data representing a first translated image by setting the color information values for each pixel in the second plurality of pixels to the first color. Even further, the method may include the step of storing, in a customer authentication database, the data representing the first translated image based on a determination that a customer associated with the first image approves of the visible information.

Even further, certain disclosed embodiments provide other systems and computer-implemented methods for the sourcing of visible information using a scalable vector format. For example, the method may include the step of receiving a request to add first visible information to a transaction card. The method may further include the step of capturing data representing a first image of visible information, the first image comprising a first plurality of pixels, the pixels being represented in the data by color information values. The method may also include the step of determining a background color of the first image by finding a first most common color among the first plurality of pixels, the background color being represented by a color information value. In addition, the method may include the step of determining a first pixel in the first plurality of pixels that is within a first threshold of the background color. The method may also include the step of translating the data representing the first image to data representing a first translated image by setting the color information value for the first pixel to a first color. Additionally, the method may include the step of determining a second color of the translated first image by finding a second most common color among the first plurality of pixels. The method may also include the step of mapping the data representing the translated image to a bounding box. Further, the method may include the step of converting the data representing the mapped image into a vector format. Even further, the method may include the step of providing the data representing the converted image data to a laser machining system.

Certain disclosed embodiments also provide systems and computer-implemented methods for electronically verifying information on a transaction card. For example, the method may include the step of receiving a request to provide a verification status for the transaction card. The method may also include the step of receiving first visible information, the first visible information comprising a signature of a customer written on a point-of-sale terminal. The method may further include the step of receiving second visible information, the second visible information comprising a vector representation of a user signature on a transaction card. The method may also include the step of determining the verification status based on a comparison of the first visible information to the second visible information, which may comprises the steps of running a similarity analysis between the first and second visible information, calculating a score based on the similarity analysis, and comparing the score with a first predetermined threshold. Even further, the method may also include the step of sending the verification status.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 1A is a front view of an exemplary transaction card, consistent with disclosed embodiments;

FIG. 1B is a rear view of the exemplary transaction card of FIG. 1A, consistent with disclosed embodiments;

FIG. 1C is an edge view of the exemplary transaction card of FIG. 1A, consistent with disclosed embodiments;

DETAILED DESCRIPTION

Figure 2:
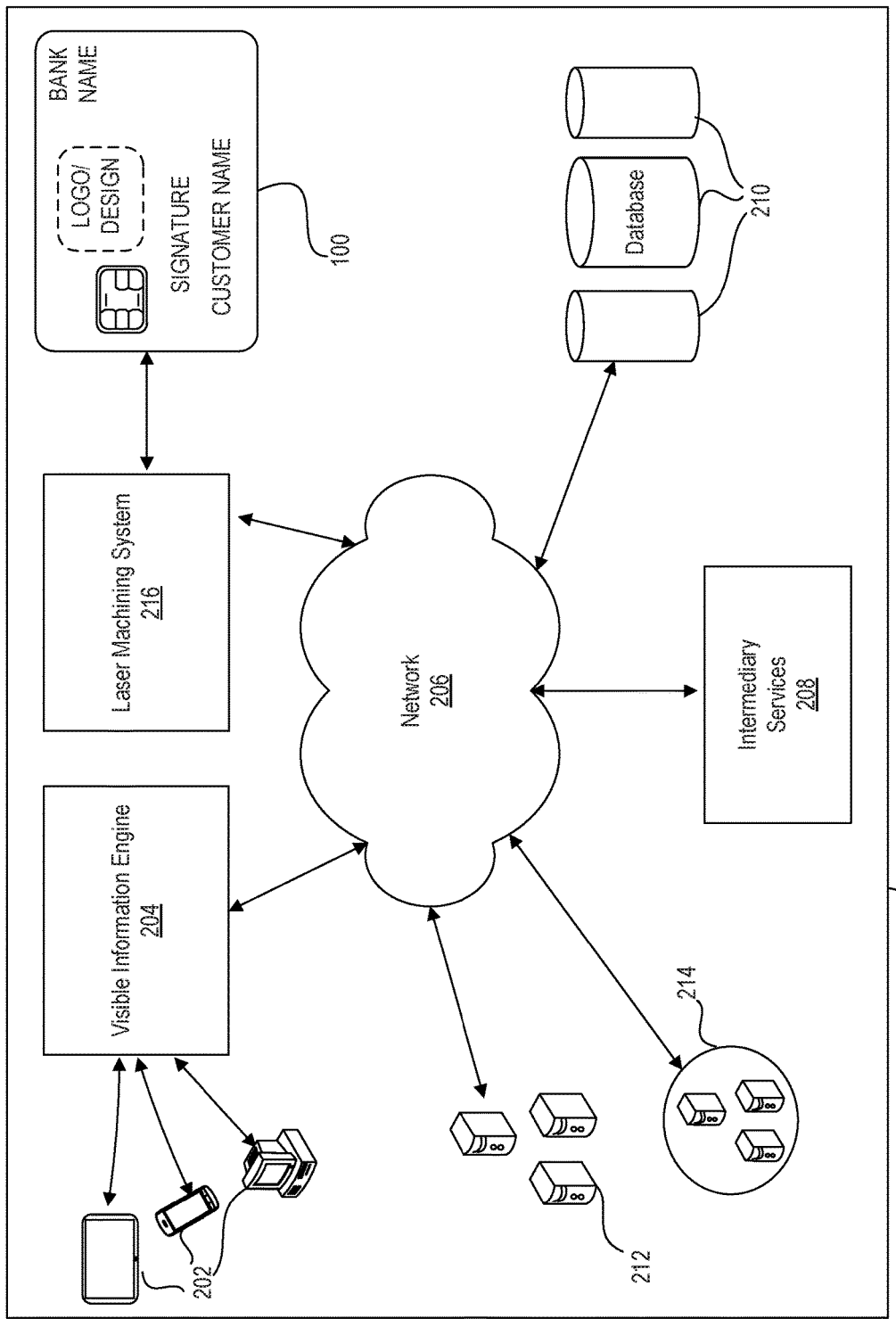
FIG. 2 is a schematic diagram illustrating an exemplary system environment to enable the sourcing of visible information using a scalable vector format, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

The term "transaction card," as used herein, may refer to a physical card product that includes features to provide transaction information. As used herein, the term "visible information" may include "personal information," that is, information which is associated with a customer of the card or information associated with an account of/for the card customer. In some embodiments, visible information may include "transaction information," such as financial information (e.g., card numbers, account numbers, expiration dates, etc.), quasi-financial information (e.g., rewards program identification, discount information, etc.), individual-identifying information (e.g., name, address, signature, etc.), bank information, and/or transaction network information. In some embodiments, visible information may serve as a security element (e.g., to prevent fraud) for the transaction cards, such as signatures or signature specimens, card numbers, expiration dates, or the like. Examples of transaction cards include credit cards, debit cards, gift cards, rewards cards, frequent flyer cards, merchant-specific cards, discount cards, identification cards, membership cards, and driver's licenses, but are not limited thereto. The physical properties of the transaction card (e.g., size, flexibility, location of various components included in the card) may meet the various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/ICE 7810.

FIGS. 1A-1C show front-, rear-, and edge-view illustrations, respectively, of an exemplary embodiment of transaction card 100. The front-view illustration of FIG. 1A shows a first side 102 (e.g., a front side) of transaction card 100, and the rear-view illustration of FIG. 1B shows a second side 104 (e.g., a rear side) of transaction card 100 opposite the first side 102. That is, first side 102 may face a first direction outward from a center of transaction card 100, and second side 104 may face a second direction outward from the center of transaction card 100 such that the second direction is generally opposite the first direction. For example, transaction card 100 may have a three-dimensional structure with a first dimension $D_1$ (e.g., a width), a second dimension $D_2$ (e.g., a length), and a third dimension $D_3$ (e.g., a thickness), wherein the first side 102 and second side 104 of card 100 are separated by at least one of $D_1$, $D_2$, and $D_3$. As shown in FIG. 1C, first and second sides 102 and 104 of transaction card 100 are separated by $D_3$ (e.g., a thickness of card 20). It is noted that transaction card 100 is not limited to rectangular shapes and designs, and that dimensions $D_1$, $D_2$, and $D_3$ may vary with respect to one another such that transaction card 100 may resemble a different shape.

As shown in FIG. 1A, first side 102 of transaction card 100 may include visible information 110. Visible information 110 may include, for example, personal information, such as information that is associated with a card, a customer of the card, or information relating to an account associated with the card or card customer. In some embodiments, visible information 110 may include visible information as defined above and/or other information. As will be explained below, visible information 110 may be disposed on a surface of transaction card 100 to enable information to be visible from first side 102 of transaction card 100. In other embodiments, visible information 110 may also or alternatively be disposed on a surface of transaction card 100 to enable information to be visible from another side of transaction card 100, such as second side 104.

A first data storage component 112 may also be visible, exposed, or otherwise accessible (e.g., visibly, mechanically, or electronically) from first side 102 of transaction card 100. For example, data storage component 112 (e.g., an EMV chip) may be accessible through an aperture 114 (shown in FIG. 1A), recess, or other type of opening on first side 102 of transaction card 100. In some embodiments, data storage component 112 and aperture 114 may be located on a different side of transaction card 100, such as second side 104. In other embodiments, first side 102 of transaction card 100 may not include data storage component 112 or aperture 114. As used herein, a "data storage component" may be one or more devices and/or elements configured to receive, store, process, provide, transfer, send, delete, and/or generate information. For example, data storage component 112 may be a microchip (e.g., a Europay, MasterCard, and Visa (EMV) chip), a communication device (e.g., Near Field Communication (NFC) antenna, Bluetooth® device, WiFi device), a magnetic stripe, a barcode, Quick Response (QR) code, etc. Data storage component 112 may be secured, affixed, attached, or the like, to aperture 114 in such a way that allows aperture 144 to carry data storage component 112 while maintaining a utility of data storage component 112 (i.e., allowing data storage component 112 to interact with a point-of-sales (POS) terminal). Data storage component 112 may be configured to ensure that data storage component 112 functions properly during data storage and transmission, for example, ensuring that a card containing a RFID (radio frequency identification) device shielded by a material layer can still be properly read by a RFID reader through the material layer.

As shown in FIG. 1B, visible information 120 may be disposed on and/or visible from second side 104 of transaction card 100. Visible information 120 may include the same or different information with respect to visible information 110 (referring to FIG. 1A). For example, visible information 120 may include visible information as described above as well as contact information, a serial number, a hologram, manufacturer information, and/or other information.

A second data storage component 122 (e.g., a magnetic stripe) may be visible from, disposed on, or otherwise accessible (e.g., visibly, mechanically, or electronically) from second side 104 of transaction card 100. Although data storage component 122 is shown in FIG. 1B as extending along dimension $D_2$ (e.g., a length of transaction card 100), it is understood that data storage component 122 may extend along a different dimension (e.g., $D_1$) or multiple dimensions. In some embodiments, second side 104 of transaction card 100 may not include data storage component 122. In other embodiments, data storage component 122 may be included on first side 102 of transaction card 100.

FIG. 2 is a schematic diagram illustrating an exemplary system environment to enable the sourcing of visible information using a scalable vector format, consistent with disclosed embodiments. FIG. 2 shows a diagram of an exemplary system 200, consistent with disclosed embodiments, revealing some technical aspects of the present disclosure for achieving the intended results of the present disclosure. Referring to FIG. 2, system 200 may include customer terminal(s) 202, a visible information engine 204, a network 206, an intermediary service(s) 208, a database(s) 210, a server cluster(s) 212, a cloud server(s) 214, a laser machining system 216, and transaction card 100. The components and arrangement of the components included in system 200 may vary. Thus, system 200 may further include other components or devices that perform or assist in the performance of one or more processes consistent with the disclosed embodiments. The components and arrangements shown in FIG. 2 are not intended to limit the disclosed embodiments, as the components used to implement the disclosed processes and features may vary.

As shown in FIG. 2, a plurality of customer terminals 202 may be implemented using a variety of different equipment, such as supercomputers, personal computers, servers, mainframes, mobile devices, smartphones, tablets, etc. In some embodiments, customer terminals 202 may be associated with a financial service provider. In some embodiments, customer terminals 202 may belong to a customer. Customer terminals 202, in some embodiments, may be a machine or kiosk such as an automated teller machine (ATM), etc. In some embodiments, customer terminals 202 may be configured to receive input from a customer, such as input (e.g., visible information) regarding a transaction card.

Visible information engine 204 may be implemented using different equipment, such as one or more supercomputers, one or more personal computers, one or more servers (e.g., server clusters 212 and/or cloud service 214), one or more mainframes, one or more mobile devices, or the like. In some embodiments, visible information engine 204 may comprise hardware, software, and/or firmware modules. Visible information engine 204 may be configured to enable the sourcing of visible information using a scalable vector format. For example, visible information engine 204 may source visible images by providing instructions that will allow a customer of a financial service provider to capture, map, resize, convert, and/or save an image. Visible information engine 204 may also be configured to verify visible information entered into a point-of-service terminal with a scalable vector formatted file representing the visible information stored for a transaction card.

Visible information engine 204, in some embodiments, may be stored locally on customer terminals 202. In some embodiments, visible information engine 204 may be stored remotely from customer terminals 202. In some embodiments, visible information engine 204 may be stored on the one or more servers of the financial service provider (e.g., a bank, credit union, credit card issuer, or other type of financial service entity). In some embodiments, an employee representing a financial service provider may input a plurality of visible information (e.g., a customer's signature). Furthermore, in some embodiments, an employee representing the financial service provider may assist in inputting a plurality of visible information. In some embodiments, customer terminals 202 and/or visible information engine 204 may require a customer to satisfy one or more security measures. For example, a customer may be required to input or speak a password, social security number, an account number, or the like. As another example, a customer may be required to enter biometric data such as a fingerprint or an eye scan. A customer may also be required to enter or select a pattern of images, spoken words, text, or the like. Even further, as an example, a customer may be required to answer security questions or complete various anti-hacking or cracking security measures such reCAPTCHA. In some embodiments, after satisfying one or more security measures, visible information engine 204 may associate the customer with a financial account and accept the financial transactions for that financial account.

In some embodiments, visible information engine 204 may engage a camera of customer terminals 202 to take a picture of visible information (e.g., a customer's signature) provided by the customer. As another example, visible information engine 204 may cause customer terminals 202 to execute a web browser that may allow a customer to input (i.e., upload) a stored picture or file comprising visible information. In some embodiments, visible information engine 204 may cause customer terminals 202 to send the inputted picture of visible information to visible information engine 204 for processing.

Network 206, in some embodiments, may comprise one or more interconnected wired or wireless data networks that receive data from one service or device (e.g., visible information engine 204) and send it to another service or device (e.g., intermediary services 208, databases 210, server clusters 212, cloud service 214). For example, network 206 may be implemented as one or more of the Internet, a wired Wide Area Network (WAN), a wired Local Area Network (LAN), a wireless LAN (e.g., IEEE 802.11, Bluetooth, etc.), a wireless WAN (e.g., WiMAX), and the like. Each component in system 200 may communicate bidirectionally with other system 200 components either through computer network 206 or through one or more direct communication links, (not all are shown).

Intermediary services 208 may be implemented using different equipment, such as one or more supercomputers, one or more personal computers, one or more servers (e.g., server clusters 212 and/or cloud service 214), one or more mainframes, one or more mobile devices, or the like. In some embodiments, intermediary services 208 may comprise hardware, software, and/or firmware modules.

In some embodiments, intermediary service 208 may contain instructions to properly associate inputted data including visible information received from visible information engine 204 with previously stored visible information associated with a customer. In some embodiments, intermediary service 208 may store the associated input data including visible information into the database. In other embodiments, intermediary service 208 may send this inputted data including visible information to laser machining system 216 for processing. Intermediary service 208, in some embodiments, may update customers associated with a financial account regarding the updated visible information. For example, the plurality of intermediary services 208 could send customers an update using electronic messaging, such as text, email, or the like. In some embodiments, intermediary services 208 could cause a physical mailing to be mailed to the customers. In some embodiments, intermediary services 208 could cause customer terminals 202 and/or visible information engines 204 to update the customers. For example, intermediary services 208 could cause terminal 202 and/or visible information engine 204 to display the updated information to the customers or send customers an update using electronic messaging, such as text, email, or the like. Intermediary services 208 may also contain instruction to handle visible information associated with a customer.

Databases 210 may be configured to store information consistent with the disclosed embodiments. In some aspects, components of system 200 (shown and not shown) may be configured to receive, obtain, gather, collect, generate, or produce information to store in databases 210. In certain embodiments, for instance, components of system 200 may receive or obtain information for storage over communications network 206. By way of example, databases 210 may store information associated with a plurality of customers. The information may include personal information, transaction information, transaction network information, contact information, inputted data into visible information engine 204, and/or other information. In another example, databases 210 may store responses produced by and requests to visible information engine 204. In other aspects, components of system 200 may store information in databases 210 without using a computer network 206 (e.g., via a direct connection). In some embodiments, components of system 200, including but not limited to visible information engine 204, may use information stored in databases 210 for processes consistent with the disclosed embodiments.

Server clusters 212 may be located in the same data center or different physical locations. Multiple server clusters 212 may be formed as a grid to share resources and workloads. Each server cluster 212 may include a plurality of linked nodes operating collaboratively to run various applications, software modules, analytical modules, rule engines, etc. Each node may be implemented using a variety of different equipment, such as a supercomputer, personal computer, a server, a mainframe, a mobile device, or the like. In some embodiments, the number of servers and/or server clusters 212 may be expanded or reduced based on workload. In some embodiments, one or more components of visible information engine 204 (including one or more server clusters 212) may be placed behind a load balancer to support high availability and ensure real-time (or near real-time) processing of optimal decision predictions, consistent with disclosed embodiments.

Cloud service 214 may include a physical and/or virtual storage system associated with cloud storage for storing data and providing access to data via a public network such as the Internet. Cloud service 214 may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 206. In some embodiments, cloud service 214 comprises multiple computer systems spanning multiple locations and having multiple databases or multiple geographic locations associated with a single or multiple cloud storage services. As used herein, cloud service 214 refers to physical and virtual infrastructure associated with a single cloud storage service. In some embodiments, cloud service 214 manages and/or stores data associated with the disclosed embodiments.

Laser machining system 216 may include a physical and/or virtual storage system associated with storage for storing data and providing access to data via a public network such as the Internet. Laser machining system 216 may also be configured to generate (e.g., using a laser to effect a property change on something because of chemical or molecular alteration, burning, foaming, melting, charring, ablation, etching, printing, or the like) high-quality images processed by visible information engine 204 onto transaction card 100 using vector formatted file types. In some embodiments, configuring laser machining system 216 involves providing a firmware update. For example, in some embodiments, a remote server may cause this firmware to update remotely. In other embodiments, a person may cause this firmware to update manually and/or locally. Vector formatted file types that may be compatible with laser machining system 216 may include Scalable Vector Graphics (SVG), Encapsulated PostScript (EPS), Drawing (DWG), or the like. In some embodiments, these vector formatted file may be compatible with a controller of laser machining system 216. In other embodiments, the vector formatted file may be compatible with a third-party application (e.g., a CAM software application). Laser machining system 216 also may be configured to create property changes resulting in visible information (e.g., a customer's signature) being form on transaction card 100, which can be made from various materials, such as metal, wood, fabric, plastic, copper, or the like. In some embodiments, laser machining system 216 may receive drive signals that instruct a carriage to move the layer and the laser to intensify output. In some embodiments, laser machining system 216 may use a continuous laser beam. In some embodiments, laser machining system 216 may use a pulsating laser beam.

Figure 3:
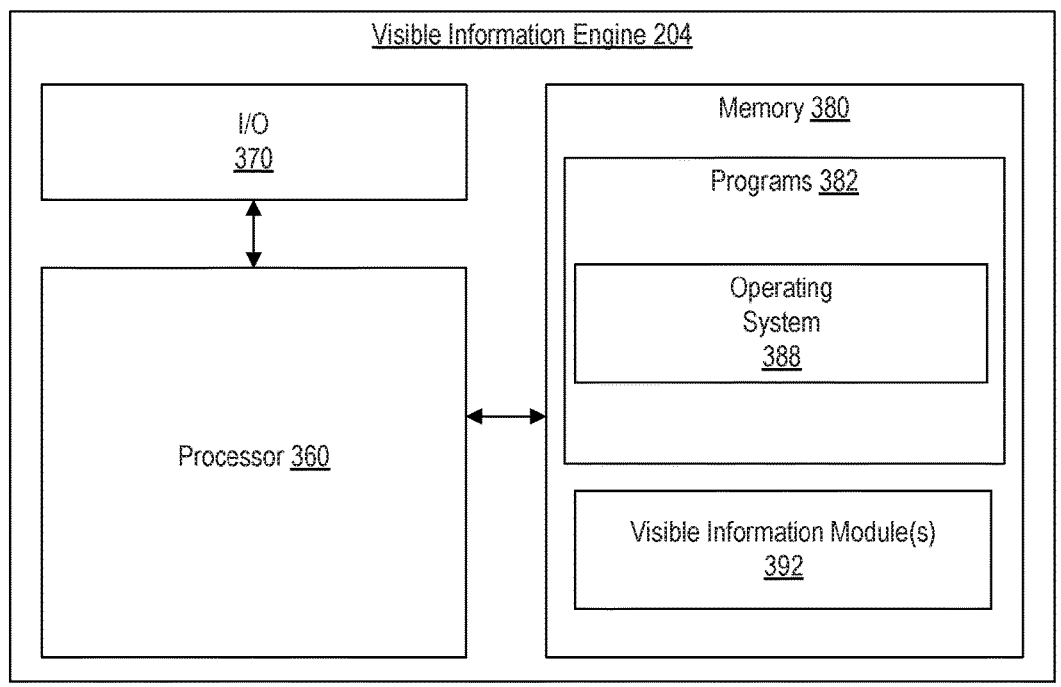
FIG. 3 is a block diagram of an exemplary visible information engine to perform functions of the disclosed methods, consistent with disclosed embodiments.

FIG. 3 is a diagram of an exemplary visible information engine configured to perform functions of the disclosed methods, consistent with disclosed embodiments. As shown, visible information engine 204 may include one or more processor 360, input/output ("I/O") devices 370, and memory 380 storing data and programs 382 (including, for example, operating system 388). As noted above, visible information engine 204 may be a single server or may be configured as a distributed computer system including multiple servers or computers (e.g., server clusters 212 and/or cloud service 214) that interoperate to perform one or more of the processes and functionalities associated with the disclosed embodiments. In some embodiments, visible information engine 204 is specially configured with hardware and/or software modules for performing functions of disclosed methods. For example, visible information engine 204 may include programs 382 (including operating system 388) and/or visible information module(s) 392. The modules can be implemented as specialized circuitry integrated within processor 360 or in communication with processor 360, and/or specialized software stored in memory 380 (as depicted in FIG. 3) executable by processor 360.

Processor 360 may be one or more known or custom processing devices designed to perform functions of the disclosed methods, such as a single core or multiple core processors capable of executing parallel processes simultaneously. For example, processor 360 may be configured with virtual processing technologies. In certain embodiments, processor 360 may use logical processors to execute and control multiple processes simultaneously. Processor 360 may implement virtual machine technologies, including a Java® Virtual Mmachine, or other known technologies to provide the ability to execute, control, run, manipulate, store, etc., multiple software processes, applications, programs, etc. In another embodiment, processor 360 may include a multiple-core processor arrangement (e.g., dual core, quad core, etc.) configured to provide parallel processing functionalities to allow visible information engine 204 to execute multiple processes simultaneously. One of ordinary skill in the art would understand that other types of processor arrangements could be implemented that provide for the capabilities disclosed herein.

Visible information engine 204 may also include one or more I/O devices 370 that may comprise one or more interfaces for receiving signals or input from devices and providing signals or output to one or more devices that allow data to be received and/or transmitted by visible information engine 204. Visible information engine 204 may also include interface components that display information and/or provide interfaces to one or more input devices, such as one or more keyboards, mouse devices, and the like, that enable in visible information engine 204 to receive input from a customer or administrator (not shown).

Visible information engine 204 may include memory configured to store information used by processor 360 (or other components) to perform certain functions related to the disclosed embodiments. In one example, visible information engine 204 may include memory 380, comprising one or more storage devices, that store instructions to enable processor 360 to execute one or more applications, such as server applications, network communication processes, and any other type of application or software known to be available on computer systems. Alternatively or additionally, the instructions, application programs, etc., may be stored in an internal database or external storage (not shown) in direct communication with visible information engine 204, such as one or more database or memory accessible over network 206. The internal database and external storage may be a volatile or non-volatile, magnetic, semiconductor, tape, optical, removable, non-removable, or other type of storage device or tangible (i.e., non-transitory) computer-readable medium.

Visible information engine 204 may also be communicatively connected to one or more remote memory devices (e.g., remote databases (not shown)) through network 206 or a different network. The remote memory devices may be configured to store information (e.g., structured, semi-structured, and/or unstructured data) and may be accessed and/or managed by visible information engine 204. By way of example, the remote memory devices may be document management systems, Microsoft® SQL database, Share- Point® databases, Oracle® databases, Sybase™ databases, or other relational databases. Systems and methods consistent with disclosed embodiments, however, are not limited to separate databases or even to the use of a database.

In one embodiment, visible information engine 204 may include memory 380 that includes instructions that, when executed by processor 360, perform one or more processes consistent with the functionalities disclosed herein. Methods, systems, and articles of manufacture consistent with disclosed embodiments are not limited to separate programs or computers configured to perform dedicated tasks. For example, visible information engine 204 may include memory 380 that stores instructions constituting one or more programs 382 and/or visible information modules 392 to perform one or more functions of the disclosed embodiments. Moreover, processor 360 may execute one or more programs located remotely from system 200. For example, visible information engine 204 may access one or more remote programs, that, when executed, perform functions related to disclosed embodiments.

Memory 380 may include one or more memory devices that store data and instructions used to perform one or more features of the disclosed embodiments. For example, memory 380 may represent a tangible and non-transitory computer-readable medium having stored therein computer programs, sets of instructions, code, or data to be executed by processor 360. Memory 380 may include, for example, a removable memory chip (e.g., EPROM, RAM, ROM, DRAM, EEPROM, flash memory devices, or other volatile or non-volatile memory devices) or other removable storage units that allow instructions and data to be accessed by processor 360.

Memory 380 may also include any combination of one or more relational and/or non-relational databases controlled by memory controller devices (e.g., server(s), etc.) or software, such as document management systems, Microsoft® SQL database, SharePoint® databases, Oracle® databases, Sybase™ databases, other relational databases, or non-relational databases such as key-value stores or NoSQL™ databases such as Apache HBase™. In some embodiments, memory 380 may comprise an associative array architecture, such as a key-value storage, for storing and rapidly retrieving large amounts of information.

Programs 382 stored in memory 380 and executed by processor(s) 360 may include one or more operating system 388. Programs 382 may also include one or more machine learning, trending, and/or pattern recognition applications (not shown) that cause processor(s) 360 to execute one or more processes related to identifying, scoring, and/or ranking of transaction structures. For example, the one or more machine learning, trending, and/or pattern recognition applications may provide, modify, or suggest input variables associated with one or more other programs 382.

Figure 4:
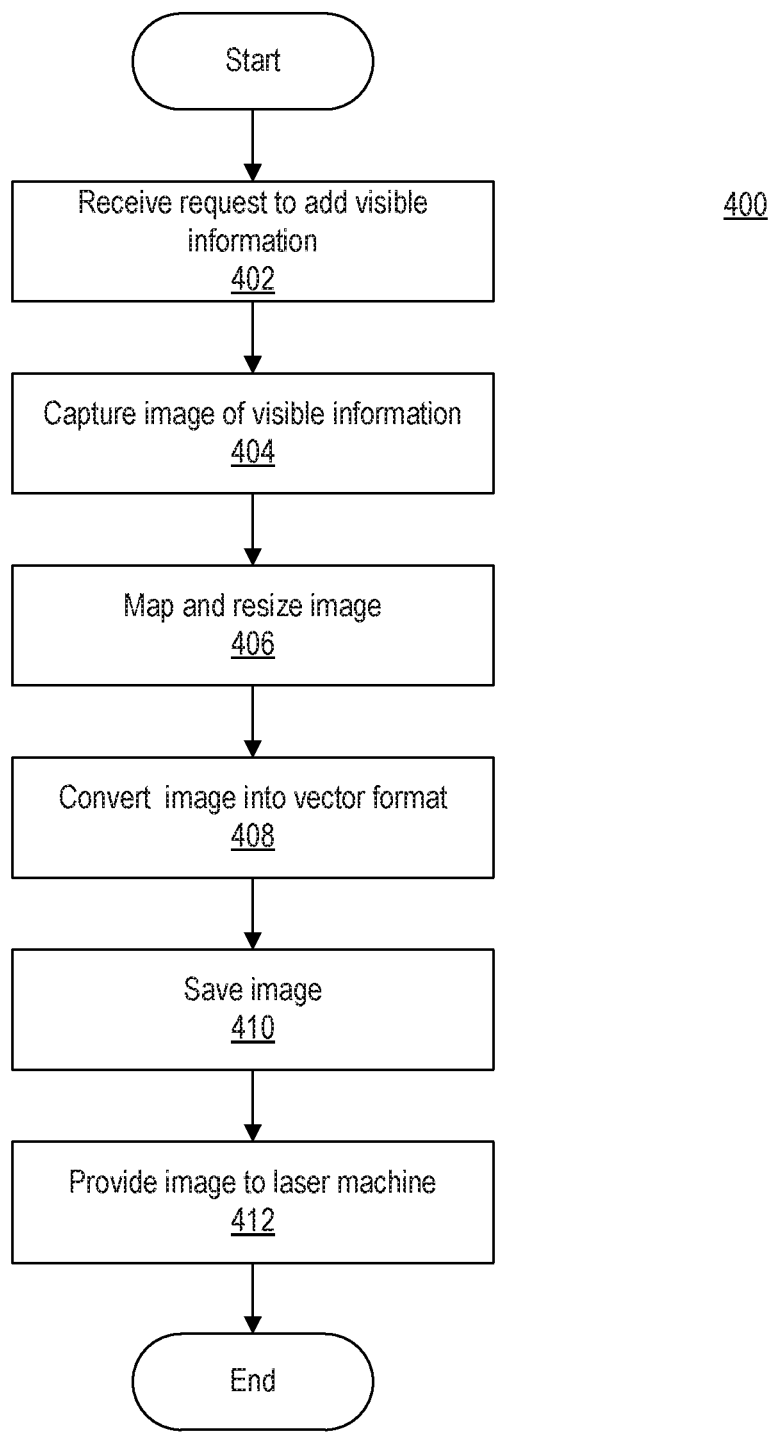
FIG. 4 is a flowchart of an exemplary process for electronically enabling the sourcing of visible information using a scalable vector format, consistent with disclosed embodiments.

FIG. 4 is a flowchart of an exemplary process for electronically enabling the sourcing of visible information using a scalable vector format, consistent with disclosed embodiments. At step 402, consistent with disclosed embodiments, visible information modules 392 may receive a request to add visible information (e.g., a customer's signature) to a card. For example, in some embodiments, visible information modules 392 may receive this request because a customer of a financial service provider would like to order a new transaction card 100 or update an existing transaction card 100. A customer of a financial service provider may be an actual customer or a perspective customer of the financial service provider. As another example, in other embodiments, visible information modules 392 may receive this request from the customer or financial service provider for other reasons.

In some embodiments, step 402 may comprise receiving a request to add visible information after a customer or a financial service provider has initiated the process to issue a new card or update a preexisting card. In some embodiments, a financial service provider may send the customer a link (e.g., a hyperlink, QR code, telephone number, or the like) for the issuance of a new card or to update a preexisting card. A customer may send the link via the financial service provider as a recommendation to another customer. In other embodiments, an online advertisement for the financial service provider may include the link or the financial service provider may send the link to a customer. In other embodiments, the financial service provider could send the link to a customer in a physical mailing. In some embodiments, visible information modules 392 may receive a request to add visible information after a customer has filled out forms containing other visible information, such as personal information, transaction information, transaction network information, contact information, a serial number, a hologram, manufacturer information, and/or other information. Additionally, in some embodiments, visible information modules 392 may use intermediary services 208 to determine whether a customer is approved based on the customer credit information, preexisting account information with the financial service provider, internal parameters set by the financial service provider, the risk of fraud, or the like. This approval may be a new transaction card before receiving a request to add visible information (e.g., a customer's signature) to order a new transaction card 100 or update an existing transaction card 100. In some embodiments, visible information modules 392 may receive a request to add visible information after a customer has been presented with a prompt to add visible information by visible information modules 392.

Consistent with disclosed embodiments, at step 404, visible information modules 392 may capture an image of visible information (e.g., a customer's signature). In some embodiments, to capture an image may involve capturing a representation of an image (e.g., a pressure-sensitive imprint.) In some embodiments, capturing an image of visible information includes causing customer terminals 202 to enable an input/output device, such as a camera or the like, to allow the customer to take a picture of the visible information. In some embodiments, visible information modules 392 may obtain verification from the customer before causing the camera of customer terminals 202 to be enabled. Obtaining verification may involve providing instructions to cause customer terminals 202 to display a prompt that allows a customer to choose between option(s) that indicate whether the customer intends to allow visible information modules 392 to cause customer terminals 202 to enable a camera of customer terminals 202. In other embodiments, visible information modules 392 may provide instructions to cause customer terminals 202 to enable one or more of its cameras without verification. After a customer activates the one or more cameras and takes a picture, visible information modules 392 may receive an image file representative of the picture. In other embodiments, capturing visible information may include providing instructions to cause customer terminals 202 to display a prompt that allows a customer to upload a preexisting image stored in hardware on customer terminals 202.

Consistent with disclosed embodiments, at step 406, visible information modules 392 may allow a customer to map and resize an image of visible information (e.g., a customer's signature). In some embodiments, visible information modules 392 may provide instructions to cause customer terminals 202 to display a bounding box. A bounding box, in some embodiments, comprises an enclosed area that designed for contents to fit inside of it. In some embodiments, a bounding box has a border that is visually distinct from the area inside of the border. A bounding box may be any shape, size, or color. The bounding box may be configured to be any size and in any position on transaction card 100. For example, the bounding box may be displayed on customer terminals 202 over or underneath the first side 102 or the second side 104 of transaction card 100. As another example, in some embodiments, the size of the bounding box may be dependent on the size of transaction card 100. As a further example, in some embodiments, the position, size, shape, and other characteristics of the bounding box could vary based on the type, material, size, color, etc., of transaction card 100.

Additionally, the bounding box may be used as a guide by the customer to resize the received captured image manually. For example, visible information modules 392 may provide instructions to cause customer terminals 202 to display a bounding box and an unaltered captured image. Visible information modules 392 may provide instructions to cause customer terminals 202 to allow a customer to drag and resize the image so that a customer could cause the image to fit inside of the bounding box. In other embodiments, visible information modules 392 may provide instructions to cause customer terminals 202 to display a bounding box before the image is captured. For example, the bounding box may be transparent except for the border of the bounding box, so that a customer could line-up visible information (e.g., a customer's signature) to be within the bounding box before the image is captured by a camera of customer terminals 202.

In some embodiments, visible information modules 392 may provide instructions to cause customer terminals 202 to indicate that the visible information is inside of the bounding box. For example, visible information modules 392 may provide instructions to cause customer terminals 202 to change the color of the bounding box's border to red when part of the visible information (e.g., a customer's signature) is outside of the bounding box and green when the visible information is completely inside of the bounding box. In some embodiments, when the visible information is completely inside the bounding box, visible information modules 392 may cause customer terminals 202 to display a notification indicating that the resize was a success and automatically move on to the next steps.

In some embodiments, a customer can cause customer terminals 202 to send a notification to visible information modules 392 that the customer is done with mapping and resizing the image in the bounding box. For example, the customer may send a notification that the customer is done by tapping the screen, selecting a button, speaking, gesturing, or the like. In other embodiments, visible information modules 392 may map and resize the image to fit inside of the bounding box automatically by using mathematical formulas/algorithms, such as interpolation, sampling, or transformations, to fit the image inside of the bounding box. In some of the embodiments, visible information modules 392 may cause customer terminals 202 to display this automatically mapped and resized image in the bounding box.

At step 408, consistent with disclosed embodiments, visible information modules 392 may convert the resized image into vector formats, such as SVG, EPS, DWG, or the like. In some embodiments, visible information model 392 may convert the resized image from a flat image format (e.g., PNG) to vector form. For example, visible information model 392 may use an outside process, known as an image tracer, vectorization program, or the like, that takes the resized image saved in a flat image format and converts it to a vector image. In other embodiments, visible information model 392 may convert the resized image saved in a flat image format to a vector image on its own using various mathematical formulas and digital processing techniques. In other embodiments, step 408 may not be needed when customer terminals 202 may have saved the image as a vector format on image capture (e.g., during one of steps 404 and 406).

At step 410, consistent with disclosed embodiments, visible information modules 392 may save an image of the visible information. In some embodiments, visible information modules 392 may save a converted image of the visible information to database 210. Saving the converted image to the database may comprise associating the saved image of visible information with other visible information, such as transaction information, personal information, or the like. In some embodiments, visible information modules 392 may communicate with intermediary services 208 to associate and save the image of visible information to a database. In some embodiments, visible information modules 392 may communicate with intermediary services 208 to save the image of visible information on transaction card 100 during the manufacturing process. For example, once a transaction card has been created by laser machining system 216, visible information modules 392 may cause intermediary services 208 to save the image of visible information on data storage component 112 and/or data storage component 122 of transaction card 100. In some embodiments, visible information modules 392 may cause intermediary services 208 to save the image of visible information on server clusters 212 and/or cloud service 214. In some embodiments, visible information modules 392 may save the image of visible information on transaction card 100, server clusters 212, and/or cloud service 214.

At step 412, consistent with disclosed embodiments, visible information modules 392 may provide the image of visible information (e.g., a customer's signature) to laser machining system 216. In some embodiments, providing the image of visible information to laser machining system 216 may include causing laser machining system 216 to laser onto transaction card 100 the image of visible information. In some embodiments, laser machining system 216 will create visible information 110 or 120 by laser positioning and intensity commands based on the components of the vector formatted image of visible information. In some embodiments, visible information modules 392 may receive a response from laser machining system 216 indicating that the image of visible information is of an incompatible file type. In response to receiving an error for incompatible file type, in some embodiments, visible information modules 392 may convert and resave the image of visible information into a compatible vector file type.

Figure 5:
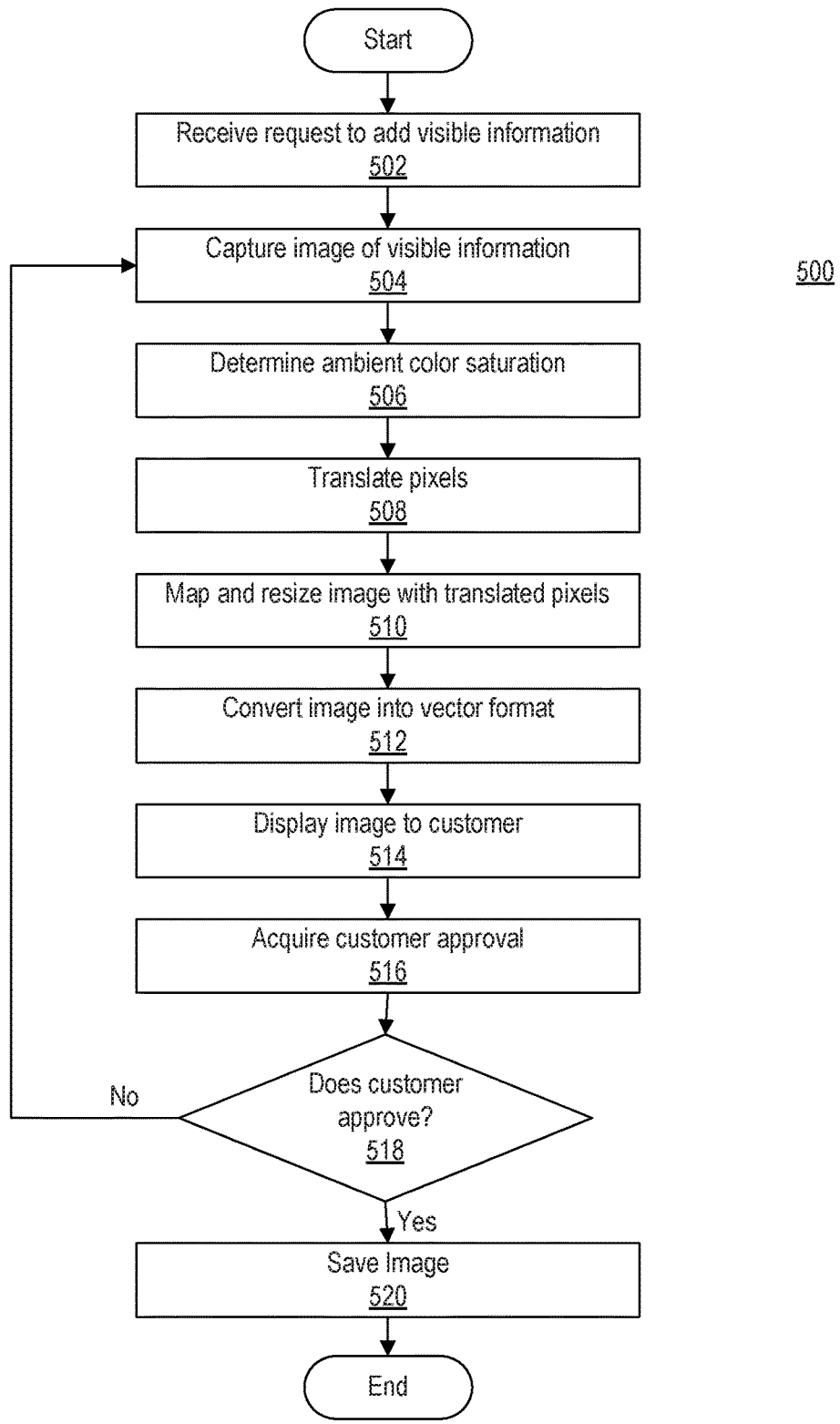
FIG. 5 is a flowchart of an exemplary process for electronically enabling the sourcing of visible information using ambient color saturation and a scalable vector format, consistent with disclosed embodiments.

FIG. 5 is a flowchart of an exemplary process for electronically enabling the sourcing of visible information using ambient color saturation and a scalable vector format, consistent with disclosed embodiments. At step 502, consistent with disclosed embodiments, visible information modules 392 may receive a request to add visible information (e.g., a customer's signature) to a card. For example, visible information modules 392 may perform techniques at step 502 that are similar to the techniques described above in reference to step 402. It should be understood that the process described by FIG. 5 is optimized for sourcing visible information in an image that has been taken using a web camera on terminal 202. However, the process described by FIG. 5 may also source visible information in an image taken using other types of imaging systems.

By performing similar techniques to those described above in reference to step 404, at step 504 visible information modules 392 may capture an image of visible information. In some embodiments, it should be understood that visible information modules 392 may receive data representing the image to capture an image of visible information. The data representing the image may define by image information for pixels in the image. In some embodiments, the pixel image information may include, for example, color information, position information, historical color information, historical position information, or any other form of information that would define the attributes of a pixel. Color information (or color information value(s)) may include, for example, a red-green-blue (RGB) value, a cyan-magenta-yellow-black (CMYK) value, a hue-saturation-lightness (HSL) value, a hue-saturation-value (HSV) value, a HEX value, a pantone matching system (PMS) value, and/or any other system that would define the appearance of a pixel. Position information (or position information value(s)) may include, for example, dimension values, such as a row-column value, an X value, a Y value, a Z value, an index number, or any other form of information that would define the position of a pixel.

Visible information modules 392 may determine the ambient color saturation of an image, at step 506. In some embodiments, the ambient color saturation may be represented by color information, as described above. The ambient color saturation, in some embodiments, may also be represented by position information that defines the region of the image where the ambient color saturation is the least and/or the most prevalent. This position information may further include dimension values, as described above.

In certain embodiments, visible information modules 392 may determine the ambient color saturation by finding the average color information for all of pixels in an image. For example, assuming that the color information for each pixel is represented by an RGB value and using the equation above, visible information modules 392 may divide the sum of all (or only a certain percentage or number) of the RGB values in the image by the total of all (or only a percentage or number) of pixels in the image.

At step 508, visible information modules 392 may translate pixels in an image based on ambient color saturation. In other words, visible information modules 392 may translate data representing an image to data representing a translated image by translating color information for pixels in the image. In some embodiments, visible information modules 392 may translate a pixel based on whether the pixel's color information exceeds or does not exceed the color information of the ambient color saturation.

Figure 6:
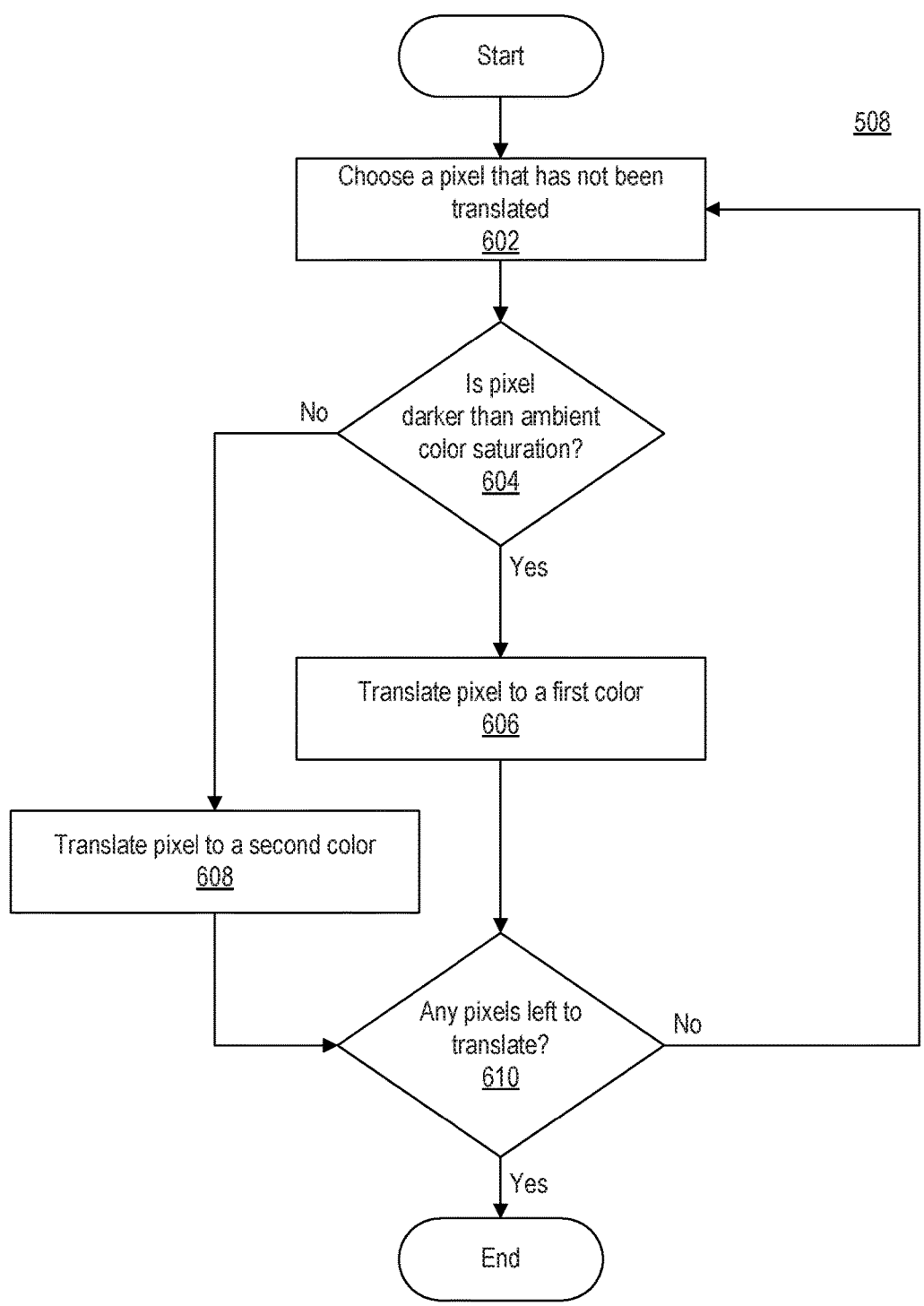
FIG. 6 is a flowchart of an exemplary process for translating pixels of an image to discover visible information based on ambient color saturation, consistent with disclosed embodiments.

Turning to FIG. 6, an exemplary process, consistent with disclosed embodiments, for translating pixels of an image to discover visible information based on ambient color saturation is shown. In some embodiments, visible information modules 392 may survey all of the pixels in an image and determine the ambient color saturation for each pixel. In other embodiments, visible information modules 392 may survey only a percentage or number of the pixels in the image to determine the ambient color saturation. Accordingly, visible information modules 392 may translate all (or only a percentage or number) of the pixels in the image before completing process 508. It should also be understood that the steps of FIG. 6 could be shown or processed in a number of ways and the order of the steps and/or the steps as described above should not be construed as limiting.

At step 602, consistent with disclosed embodiments, visible information modules 392 may choose a pixel in the image that has not been translated. After choosing a pixel, visible information modules 392 may determine whether the color information of the pixel is darker than the ambient color saturation (step 604). In some embodiments, at step 604, visible information modules 392 may, instead, determine whether the color information of the pixel is lighter than the ambient color saturation (not shown).

In certain embodiments, visible information modules 392 may determine that the color saturation of the pixel is darker than the color saturation of the ambient color saturation by determining that a value of color information of the pixel is higher or lower than a value of the color saturation for the ambient color. For example, when color information is represented by an RGB value, visible information modules 392 may determine that the color information of the pixel is darker than the color information of the ambient color saturation if the total RGB value (the red value +the green value +the blue value) of the pixel is lower than the total RGB value of the ambient color saturation. Accordingly, visible information modules 392 may determine that the color information of the pixel is lighter than the color information of the ambient color saturation if the total RGB value of the pixel is higher than the total RGB value of the ambient color saturation. In some embodiments, visible information modules 392 may only use a single value of the color information of the pixel (e.g., the red value using RGB as the color information) and corresponding value of the color information of the ambient color saturation to determine if the color saturation of the pixel is darker than the color saturation of the ambient color saturation.

At step 606, if visible information modules 392 determine that the color saturation of the pixel is darker than the color saturation of the ambient color saturation, visible information modules 392 may translate the pixel to a first color (e.g., white or any other color). However, if visible information modules 392 determine that the color saturation of the pixel is not darker than the color saturation of the ambient color saturation, visible information modules 392 may translate the pixel to a second color (step 608). Visible information modules 392 may translate the pixel by modifying the pixel's color information value to the value associated with the first or second color. In some embodiments, the first color is different from the second color. In certain embodiments, the first color is black and the second color is white. At step 610, visible information modules 392 may determine whether all the pixels in the image have been translated. If not, visible information modules 392 may repeat steps 602-610 until all (or a certain percentage or number) of the pixels in the image are translated.

Turning back to FIG. 5, at step 510, visible information modules 392 may map and resize the image with the translated pixels (i.e., map data representing the translated image), using similar techniques as described above in relation to step 406. At step 512, visible information modules 392 may convert the image into vector format (i.e., convert data representing the mapped image into a vector format) using similar techniques as described above in relation to step 408. In addition, at step 514, visible information modules 392 may cause terminal 202 to display the converted image to a customer.

Consistent with disclosed embodiments, at step 516, visible information modules 392 may acquire approval information from the customer. In some embodiments, visible information modules 392 may acquire approval information from the customer by the customer interacting or not interacting with terminal 202. In some embodiments, information modules 392 may acquire approval information from the customer by determining that the customer has not interacted with terminal 202 or part of terminal 202 for a predetermined period of time. In some embodiments, visible information modules 392 may acquire approval information from the customer based on an algorithm that compares the converted image of visible information with a saved image of visible information that visible information 392 may access. An interaction, in some embodiments, may be any kind of gesture, touch, noise, etc. that is may be used to send commands to terminal 202.

At step 518, consistent with disclosed embodiments, visible information modules 392 may determine if the customer approves of the converted image. Visible information modules 392 may determine that the customer approves or disapproves of the converted image based on the approval information. In certain embodiments, visible information modules 392 may read a data structure that includes the approval information or use the approval information in an algorithm (e.g., a machine learning algorithm) to determine whether the customer approves of the converted image. In some embodiments, visible information modules 392 may determine that the customer approves of the converted image if the customer has interacted or not interacted with terminal 202 or part of terminal 202 for a predetermined period of time.

If visible information modules 392 determine that the customer approves of the converted image, visible information modules 392 may repeat steps 504-518 to source visible information of a new image. In certain embodiments, visible information modules 392 may save the converted image with an associated data flag that the user did not approve (not shown). However, if visible information modules 392 determine that the customer approves of the converted image, visible information modules 392 may, at step 520, save the converted image using similar techniques as described above in relation to step 410. Additionally, in some embodiments, visible information modules 392 may save the converted image by storing the image (or data representing the stored image) in a customer authentication database (e.g., one or more of database(s) 210) based on the determination that a customer associated with the first image approves of the visible information. In some embodiments, visible information modules 392 may then provide the saved image to a laser machining system (not shown) as described in step 412 above.

Figure 7:
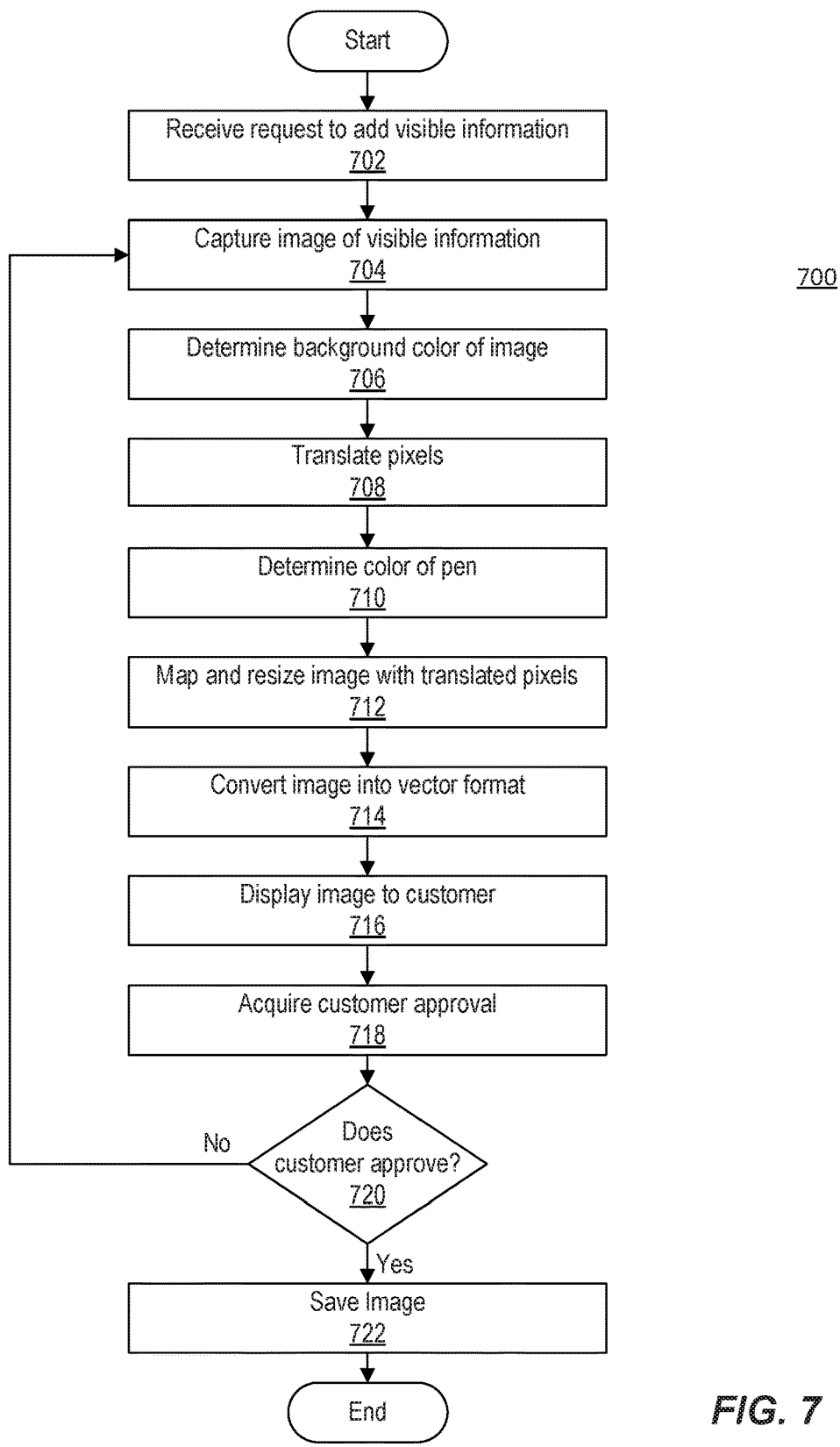
FIG. 7 is a flowchart of an exemplary process for electronically enabling the sourcing of visible information by determining the background color of an image and using a scalable vector format, consistent with disclosed embodiments.

FIG. 7 is a flowchart of an exemplary process for electronically enabling the sourcing of visible information by determining the background color of an image and using a scalable vector format, consistent with disclosed embodiments. It should be understood that the process described by FIG. 7 is optimized for sourcing visible information in an image that has been taken using a web camera on terminal 202. However, the process described by FIG. 7 may also source visible information in an image taken using other types of imaging systems.

At step 702, consistent with disclosed embodiments, visible information modules 392 may receive a request to add visible information (e.g., a customer's signature) to a card. For example, visible information modules 392 may perform techniques at step 702 that are similar to the techniques described above in reference to step 502. Likewise, at step 704, visible information modules 392 may capture an image of visible information by performing techniques that are similar to techniques described above in reference to step 504.

At step 706, consistent with disclosed embodiments, visible information modules 392 may determine the background color of the image. In some embodiments, the background color may represented by color information, as described above. The background color, in some embodiments, may also be represented by position information that defines the region of the image where the background color is the least and/or the most prevalent. This position information may further include dimension values, as described above. In certain embodiments, visible information modules 392 may determine the background color of the image by finding the most prevalent or common color of in image pixels. For example, assuming, for example, that the color information for each pixel is represented by an RGB value, visible information module 392 may determine the background color by determining the highest number of pixels that share a common RGB value, where the common RGB value would serve as the determined background color. Visible information module 392 may use all or less than all of the image pixels (i.e. a percentage or number of the pixels) to determine the background color of the image.

At step 708, consistent with disclosed embodiments, visible information modules 392 may translate pixels in the image based on the determined background color. In other words, visible information modules 392 may translate the data representing the image to data representing a translated image by translating color information for pixels in the image. In some embodiments, a pixel may be translated based on whether the pixel's color information is within a threshold of the background color.

Figure 8:
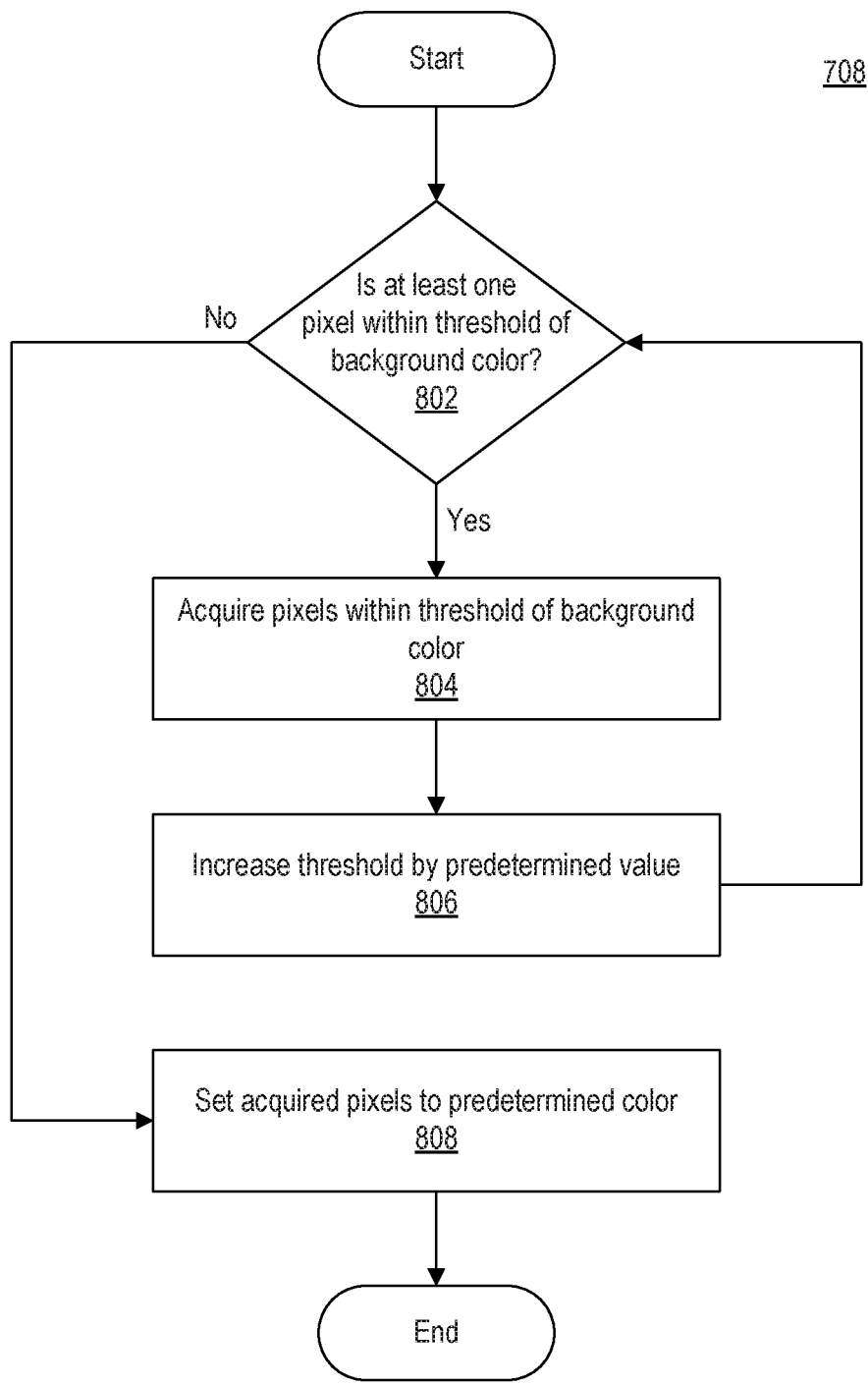
FIG. 8 is a flowchart of an exemplary process for translating pixels of an image to discover visible information based on the background color of an image, consistent with disclosed embodiments.

Turning to FIG. 8, a flowchart, consistent with disclosed embodiments, of an exemplary process for translating pixels of an image to discover visible information based on a background color of an image is shown. In some embodiments, visible information modules 392 may loop through all or less than all of the pixels in an image multiple times. It should also be understood that the steps of FIG. 8 could be shown or processed in a number of ways and the order of the steps and/or the steps as described above should not be construed as limiting.

At step 802, visible information modules 392 may determine whether there is at least one pixel in the image with color information that is within a threshold of the background color's (determined at step 706) color information. A threshold may be a percentage or number that defines how close in color an acceptable pixel may be to a background color. Visible information modules 392 may use the threshold to determine colors that are close to background color and account for variations in light in the captured image.

Visible information modules 392 may determine whether at least one pixel in the image exists with color information that is within a threshold of the background color's image by, for example, determining if the total color information value (e.g., RGB value) of a pixel is within a threshold of the total color information value of background color. In some embodiments, visible information modules 392 may only determine whether a single value of the color information of the pixel is within a threshold of a single value of the color information of the background color to determine whether at least one pixel in the image exists with color information that is within a threshold of the background color's image At step 804, consistent with disclosed embodiments, visible information modules 392 may acquire all pixels and/or data representing all pixels (including color and position information) that are within the threshold of the background color. In some embodiments, visible information modules 392 may save the pixels and/or data representing the pixels within a data structure until the steps of FIG. 8 are finished. Consistent with disclosed embodiments, at step 806, visible information modules 392 may increase the threshold by a predetermined value and repeat steps 802-806 until visible information modules 392 determine that there are no pixels or less than a certain percentage or number of pixels within the threshold (which may change by the predetermined value with each repetition of steps 802-806). If visible information modules 392 determine that there is at least one pixel in the image with color information that is within a threshold of the background color's color information, at step 808, visible information modules 392 may set the acquired pixels (acquired with repetition at step 804) to a first color (e.g., white or any other color). In certain embodiments, visible information modules 392 may select a color, such as white, that would not conflict with any common colors of a pen (e.g., blue, red, black, green, etc.)

Turning back to FIG. 7, at step 710, visible information modules 392 may determine the color of the pen. In some embodiments, visible information modules 392 may determine the color of the pen by counting the most prevalent color that is not the first color. For example, assuming that the first color is white, visible information modules 392 may determine the color of the pen by counting the most prevalent color that is the first color. In some embodiments, visible information modules 392 may enhance the color of the pen by changing the color information of pixels that are within a predetermined threshold of the pen to a second color. In some embodiments, visible information modules 392 may enhance the color of the pen by using the steps discussed in FIG. 8 above, where the color of the pen would serve as the background color.

Consistent with disclosed embodiments, at step 712, visible information modules 392 may map and resize the image with the translated pixels (i.e., map data representing the translated image), using similar techniques as described above in relation to step 406. In some embodiments, at step 714, visible information modules 392 may convert the image into vector format (i.e., convert data representing the mapped image into a vector format) using similar techniques as described above in relation to step 408. In certain embodiments, at step 716, visible information modules 392 may cause terminal 202 and/or visible information engine 204 to display the converted image to a customer using terminal 202.

At step 718, visible information modules 392 may acquire customer approval information, using similar techniques as described above in relation to step 516. In some embodiments, at step 720, visible information modules 392 may determine if the customer approves of the converted image, using similar techniques as described above in relation to step 518. In certain embodiments, at step 722, visible information modules 392 may save the converted image, using techniques that are similar, as described above, to step 520.

Figure 9:
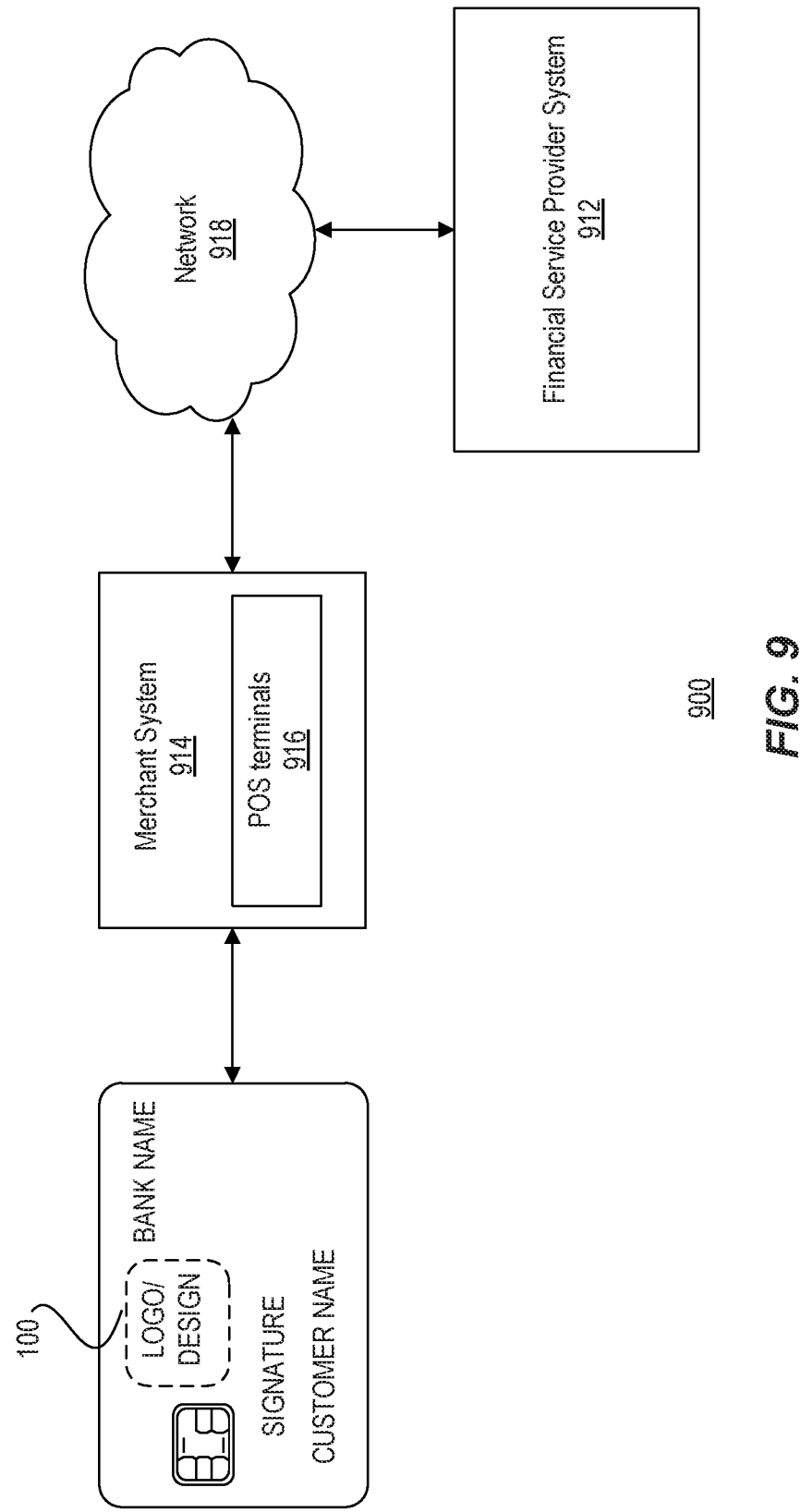
FIG. 9 is a schematic diagram illustrating an exemplary transaction system, consistent with disclosed embodiments.

FIG. 9 is a schematic diagram illustrating an exemplary transaction system, consistent with disclosed embodiments. Transaction system 900 may include a computing system configured to receive and send information between the components of transaction system 900 and components outside of transaction system 900. Transaction system 900 may include a financial service provider system 912 and a merchant system 914 that may comprise POS terminal(s) 916, communicating with each other through a network 918. Transaction system 900 may include additional and/or alternative components.

Financial service provider system 912 may include one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and other types of financial service accounts. Financial service accounts may be associated with physical transaction cards 100, such as credit or debit cards that customers use to perform financial service transactions, such as purchasing goods and/or services online or at a terminal (e.g., POS terminal, mobile device, computer, etc.). Financial service accounts may also be associated with electronic financial products and services, such as a digital wallet or similar account that may be used to perform electronic transactions, such as purchasing goods and/or services online.

Financial service provider system 912 may be implemented using different equipment, such as one or more supercomputers, one or more personal computers, one or more servers (e.g., server clusters 212 and/or cloud service 214), one or more mainframes, one or more mobile devices, or the like. In some embodiments, financial service provider 912 may comprise hardware, software, and/or firmware modules. In some embodiments, financial service provider 912 may store on its one or more servers system 200 and/or visible information engine 204. Financial service provider 912 may also be comprised of a plurality of programs stored on memory and one or more processors, or the like.

Merchant system 914 may include one or more computer systems associated with a merchant. For example, merchant system 914 may be associated with an entity that provides goods and/or services (e.g., a retail store). The merchant may include brick-and-mortar location(s) that a customer may physically visit and purchase goods and services using the transaction cards. Such physical locations may include computing devices (e.g., merchant system 914) that perform financial service transactions with customers (e.g., POS terminals 916). Additionally or alternatively, merchant system 914 may be associated with a merchant who provides an electronic shopping environment, such as a website or other online platform that consumers may access using a computer through a browser, a mobile application, or similar software. Merchant system 914 may include a client device, such as a laptop computer, desktop computer, smartphone, or tablet, which a customer may operate to access the electronic shopping mechanism. Merchant system 914 may be implemented using different equipment, such as one or more supercomputers, one or more personal computers, one or more servers (e.g., server clusters 212 and/or cloud service 214), one or more mainframes, one or more mobile devices, or the like. Merchant system 914 may also be comprised of a plurality of programs stored on memory and one or more processors, or the like.

POS terminals 916 may be implemented using different equipment, such as one or more personal computers, one or more servers (e.g., server clusters 212 and/or cloud service 214), one or more mainframes, one or more mobile devices, or the like. POS terminals 916 may also be comprised of a plurality of programs stored on memory and one or more processors, or the like.

Network 918 may include any type of network configured to facilitate communications and data exchange between components of transaction system 900, such as, for example, financial service provider system 912 and merchant system 914. Network 918 may include, but is not limited to, Local Area Networks (LANs) and Wide Area Networks (WANs), such as the Internet. Network 918 may be a single network or a combination of networks. Network 918 is not limited to the above examples and transaction system 900 may implement any type of network that allows entities (shown and not shown) of transaction system 900 to exchange data and information.

Transaction system 900 may be configured to conduct a transaction using transaction card 100. In some embodiments, financial service provider system 912 may provide transaction card 100 to a customer for use in conducting transactions associated with a financial service account held by the customer. For example, the customer may use transaction card 100 at a merchant location to make a purchase. During the purchase, information may be transferred from transaction card 100 to merchant system 914 (e.g., POS 916). Merchant system 914 may communicate with financial service provider system 912 via network 918 to verify the information and to complete or deny the transaction. For example, merchant system 914 may receive account information from transaction card 100. Merchant system 914 may transmit the account information and a purchase amount, among other transaction information, to financial service provider system 912. Financial service provider system 912 may settle the transaction by transferring funds from the customer's financial service account to a financial service account associated with the merchant.

While transaction system 900 and transaction card 100 are depicted and described in relation to transactions that involve customers, merchants, and financial service providers, it should be understood that these entities are used only as an example to illustrate one environment in which transaction card 100 may be used. Transaction card 100 is not limited to financial products and may be any physical card product that is configured to store and/or transmit information. For example, transaction card 100 may be an identification card configured to provide information to a device in order to identify the holder of the card (e.g., a driver's license).

Figure 10:
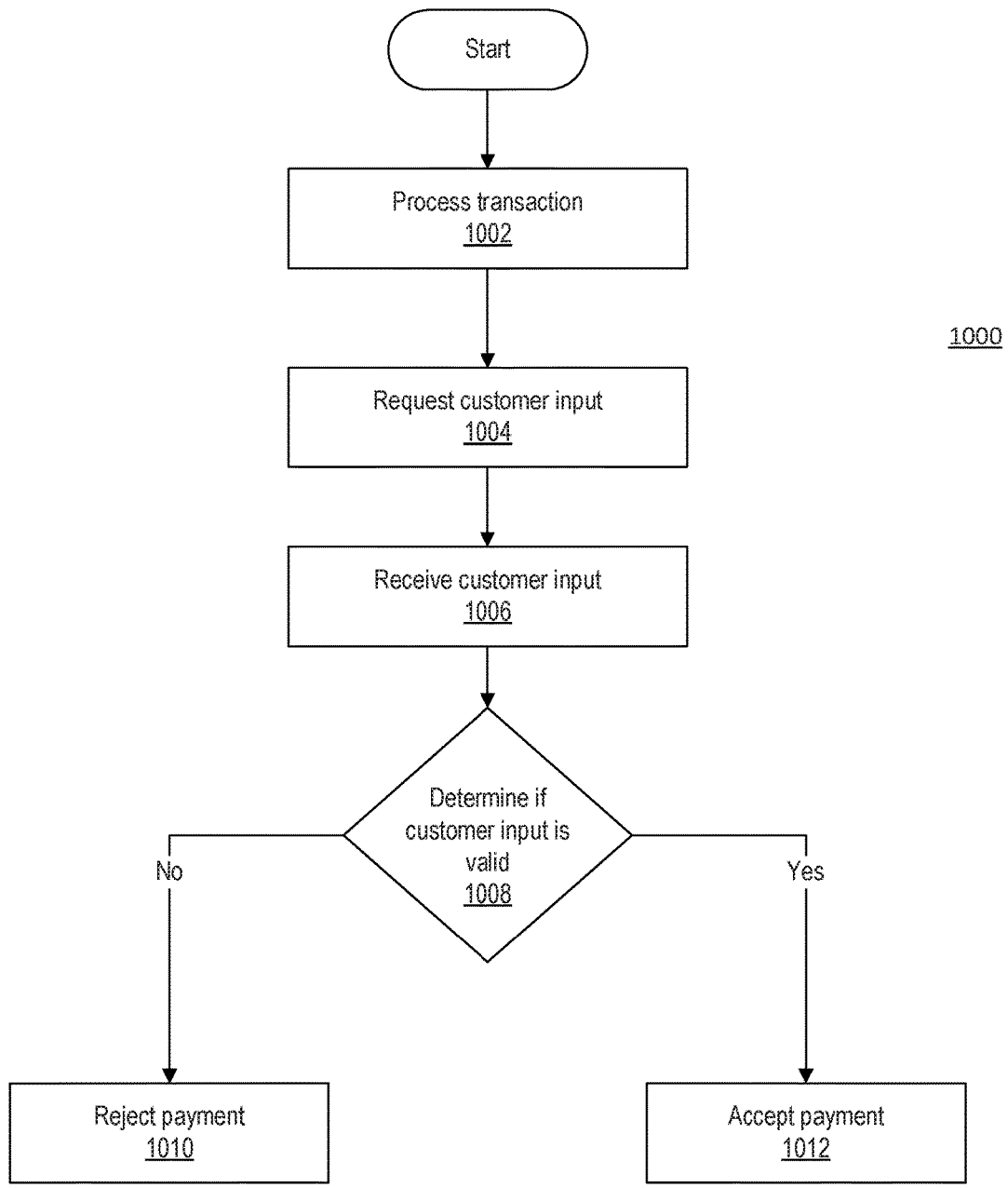
FIG. 10 is a flowchart of an exemplary process for electronically verifying visible information entered into a point-of-service terminal with a scalable vector formatted file representing the visible information stored for a transaction card, consistent with disclosed embodiments.

FIG. 10 is a flowchart of an exemplary process for electronically verifying visible information (e.g., a customer signature) entered into a POS terminal with a scalable vector formatted file representing visible information stored for a transaction card, consistent with disclosed embodiments. In some embodiments, financial service provider system 912 has one or more processors configured to store instructions consistent with the disclosed embodiments of visible information engine 204 and/or system 200. In some embodiments, financial service provider system 912 may utilize visible information engine 204 and/or system 200 to process visible information.

At step 1002, consistent with disclosed embodiments, financial service provider system 912 may process a transaction for a customer using transaction card 100. A customer may attempt to pay for an item at merchant system 914 by inserting transaction card 100 into POS terminals 916. For example, a client may insert data storage component 112 (i.e., an EMV chip) into POS terminals 916. As another example, a client may swipe data storage component 122 (e.g., magnetic stripe) through a magnetic stripe reader on POS terminal 916. In some embodiments, the stored contents of either data storage component 112 and/or data storage components 122 will be read by the POS terminal 916. In some embodiments, the stored contents of either component 112 and/or data storage components 122 will include a vector image file of visible information (e.g., a customer signature) and other visible information, such as one or more of personal information, transaction information, contact information, or the like.

At step 1004, consistent with disclosed embodiments, POS terminal 916 may request a customer to input visible information. In other embodiments, POS terminal 916 may require a customer to input visible information. In some embodiments, a customer may input visible information by writing it. In some embodiments, visible information engine 204 of financial service provider 912 may provide instructions to cause POS terminal 916 to request or require a customer to input visible information. In other embodiments, a customer may input visible information by typing it.

POS terminal 916 may provide a display containing a bounding box for visible information to be digitally written on the screen of POS terminal 916. In some embodiments, visible information engine 204 of financial service provider 912 may provide instructions to cause POS terminal 916 to provide a display containing a bounding box for visible information to be digitally written on the screen of POS terminal 916.

Consistent with disclosed embodiments, at step 1006, POS terminal 916 may receive input visible information (e.g., a customer's signature). In some embodiments, POS terminal 916 may confirm that the customer acknowledges that the input visible information is accurate before accepting the input visible information. In some embodiments, visible information engine 204 of financial service provider 912 may provide instructions to cause POS terminal 916 to confirm that the customer acknowledges that the input visible information is accurate before accepting the input visible information. This confirmation can be done, for example, by requesting and receiving a notification from the customer acknowledging that the input visible information is accurate before accepting the input visible information.

At step 1008, consistent with disclosed embodiments, POS terminal 916 may determine whether the customer's inputted visible information is valid by sending data representing the input visible information and a stored image of visible information read from data storage component 112 and/or data storage components 122 to visible information engine 204 of financial service provider system 912. In some embodiments, visible information engine 204 of financial service provider 912 may cause POS 916 to send this data. In some embodiments, financial service provider system 912 will compare the data representing the input visible information with the stored image of visible information read from data storage component 112 and/or data storage components 122. In other embodiments, financial service provider system 912 will compare the data representing the input visible information with a vector formatted image of visible information on its servers, saved consistently with step 410. In some other embodiments, financial service provider system 912 will compare the stored vector formatted visible information read from data storage component 112 and/or data storage components 122 with a saved vector formatted image of visible information on its servers consistent with step 410. To compare, for example, financial service provider system 912 may run a similarity analysis using various mathematical principles of vector formatting comparisons along with the vector formatting file contents to determine a similarity score regarding the comparison. Financial service provider system 912 may then compare the similarity score with a predetermined threshold to determine if the visible information is valid.

Consistent with disclosed embodiments, if the input visible information (e.g., a customer's signature) is determined to be not valid, in some embodiments financial service provider system 912 may cause POS terminal 916 to report that the payment is being rejected (step 1010). Financial service provider system 912 may instruct POS service to repeat steps 1004 to 1008 in order to test if the determined visible information is valid a plurality of times. Financial service provider system 912 may have a threshold value of how many times the test can be completed before the transaction is stopped. In some embodiments, financial service provider system 912 may put a temporary hold on transaction card 100, preventing the customer from completing any transactions with transaction card 100 until the issue is resolved. Further, in some embodiments, financial service provider 912 may require additional authentication to accept the transaction, such as a secret code. In some embodiments, financial service provider system 912 may report that a potential fraud has occurred and suspend transaction card 100. In some embodiments, financial service provider system 912 may notify authorities that a fraud has occurred.

At step 1012, consistent with disclosed embodiments, if the input visible information is determined to be valid, in some embodiments, financial service provider system 912 may cause POS terminal 916 to report that the payment is being accepted. Financial service provider system 912 may then take funds from the transaction from the financial account associated with transaction card 100 and deliver them to the financial account of merchant system 914.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A computer-implemented method for capturing visible information using a scalable vector format, comprising:
    capturing data representing a first image of visible information, the first image comprising a first plurality of pixels, the pixels represented in the data by color information values;
    determining a background color of the first image by determining a first most common color information value among the first plurality of pixels, the background color represented by the first most common color information value;
    determining a first set of pixels in the first plurality of pixels within a first predetermined threshold of the first most common color information value;
    translating the data representing the first image to data representing a first translated image by setting the color information value for the first set of pixels to a first color;
    determining a visible information color of the translated first image by determining a second most common color information value among the first plurality of pixels, the second most common color information value exceeding a second predetermined threshold of the first color;
    determining a second set of pixels in the translated first image within a third predetermined threshold of the second most common color information value;
    setting the color information value for the second set of pixels to a second color; and
    selectively storing, in a customer authentication database, the data representing the first translated image, based on a determination of whether a customer associated with the first image approves of the visible information.

2. The computer-implemented method of claim 1, wherein the color information values comprise a red-green-blue (RGB) value, a cyan-magenta-yellow-black (CMYK) value, a hue-saturation-lightness (HSL) value, a hue-saturation-value (HSV) value, a HEX value, or a pantone matching system (PMS) value.

3. The computer-implemented method of claim 1, wherein the first color is white.

4. The computer-implemented method of claim 1, further comprising, in response to determining the first set of pixels:
    storing the first set of pixels in a second plurality of pixels;
    determining a second predetermined threshold of the first most common color information value by incrementing the first predetermined threshold with a predetermined value;
    determining whether a second pixel in the first plurality of pixels is within the second threshold;
    in response to determining that the second pixel in the first plurality of pixels is within a second threshold:
        storing the second pixel in the second plurality of pixels; and
    translating the data representing the first image to the data representing the first translated image by setting the color information values for each pixel in the second plurality of pixels to the first color.

5. The computer-implemented method of claim 1, wherein the first image of visible information comprises a signature.

6. The computer-implemented method of claim 1, further comprising:
   transmitting, to a computing device, a request for approval of he visible information from the customer; and
   determining whether the customer approves of the visible information.

7. The computer implemented method of claim 6, further comprising:
   in response to determining that the customer does not approve of the visible information:
      capturing data representing a second image of visible information, the second image comprising a second plurality of pixels, the second plurality of pixels being represented in the data by color information values;
      determining a background color of the second image by finding a first most common color among the second plurality of pixels, the background color being represented by a color information value;
      determining a second set of pixels in the second plurality of pixels within a second threshold of the background color;
      translating the data representing the second image by setting the color information value for the second set of pixels to a third color; and
      determining a fourth color of the first image by finding a second most common color among the second plurality of pixels; and
   in response to determining that the customer approves of the visible information:
      storing, in the customer authentication database, the data representing the first translated image.

8. A computer-implemented method for capturing visible information using a scalable vector format, comprising:
   capturing data representing a first image of visible information, the first image comprising a first plurality of pixels;
   determining a first set of pixels in the first plurality of pixels being represented by a first color information value;
   determining a second set of pixels in the first plurality of pixels being represented by a second color information value;
   determining a background color of the first image by determining a first most common color information value among the first plurality of pixels, the background color being represented by the first most common color information value;
   determining whether the first color information value is within a first threshold of the first most common color information value;
   in response to determining that the first color information value is within the first threshold of the first most common color information value:
      storing the first set of pixels in a second plurality of pixels;
   determining a second threshold of the fist most common color information value by incrementing the first threshold with a predetermined value;
   determining whether the second color information value is within the second threshold of the first most common color information value;
   in response to determining that the second color information value is within the second threshold of the first most common color information value:
      storing the second set of pixels in the second plurality of pixels;
   translating the data representing the first image to data representing a first translated image comprising the first plurality of pixels and the second plurality of pixels by setting the color information values for each pixel in the first plurality of pixels to a first color and setting the color information values for each pixel in the second plurality of pixels to a second color; and
   selectively storing, in a customer authentication database, the data representing the first translated image based on a determination of whether a customer associated with the first image approves of the visible information.

9. The computer-implemented method of claim 8, wherein the color information values comprise a red-green-blue (RGB) value, a cyan-magenta-yellow-black (CMYK) value, a hue-saturation-lightness (HSL) value, a hue-saturation-value (HSV) value, a HEX value, or a pantone matching system (PMS) value.

10. The computer-implemented method of claim 8, wherein the first color is white.

11. The computer-implemented method of claim 8, further comprising:
   transmitting, to a computing device, a request for approval of the visible information from the customer; and
   determining whether the customer approves of the visible information.

12. The computer implemented method of claim 11, further comprising:
   in response to determining that he customer does not approve of the visible information:
      capturing data representing a second image of visible information, the second image comprising a third plurality of pixels, the third plurality of pixels being represented in the data by color information values;
      determining a background color of the second image by finding a first most common color information value among the third plurality of pixels, the background color being represented by a color information value;
      determining a set of pixels in the third plurality of pixels that is within a third threshold of the background color;
      translating the data representing the second image to data representing a second translated image by setting the color information value for the set of pixels in the third plurality of pixels to a third color; and
      determining a fourth color of the first image by finding a second most common color information value among the third plurality of pixels; and
   in response to determining that the customer does approve of the visible information:
      storing, in the customer authentication database, the data representing the first translated image.

13. A computer-implemented method for sourcing visible information using a scalable vector format, comprising:
   receiving a request to add first visible information to a transaction card;
   capturing data representing a first image of visible information, the first image comprising a first plurality of pixels, the pixels being represented in the data by color information values;
   determining a background color of the first image by determining a first most common color information value among the first plurality of pixels, the background color being represented by the first most common color information value;

determining a first set of pixels in the first plurality of pixels that is within a first predetermined threshold of the first most common color information value;

translating the data representing the first image to data representing a translated first image by setting the color information value for the first set of pixels to a first color;

determining a visible information color of the translated first image by determining a second most common color information value among the first plurality of pixels;

determining a second set of pixels in the translated first image within a second threshold of the second most common color information value;

setting the color information value for the second set of pixels to a second color;

mapping the data representing the translated first image to a bounding box;

converting the data representing the mapped image into a vector format; and providing the data representing the converted image data to a laser machine.

14. The computer-implemented method of claim 13, wherein the color information values comprise a red-green-blue (RGB) value, a cyan-magenta-yellow-black (CMYK) value, a hue-saturation-lightness (HSL) value, a hue-saturation-value (HSV) value, a HEX value, or a pantone matching system (PMS) value.

15. The compute-implemented method of claim 13, wherein the first color is white.

16. The computer-implemented method of claim 13, further comprising, in response to determining the first set of pixels:

storing the first set of pixels in a second plurality of pixels;

determining a second predetermined threshold of the first most common color information value by incrementing the first predetermined threshold of the first most common color information value with a predetermined value;

determining whether a third set of pixels in the first plurality of pixels is within the second predetermined threshold of the first most common color information value;

in response to determining that the third set of pixels in the first plurality of pixels is within the second predetermined threshold of the first most common color information value:

storing the third set of pixels in the second plurality of pixels; and translating the data representing the first image to the data representing the first translated image by setting the color information values for each pixel in the second plurality of pixels to the first color.

17. Currently Amended) The computer-implemented method of claim 13, wherein the first image of visible information comprises a signature.

18. The computer-implemented method of claim 13, further comprising:

transmitting, to a computing device, a request for approval of he visible information from the customer; and determining whether the customer approves of the visible information.

19. The computer implemented method of claim 18, further comprising:

in response to determining that he customer does not approve of the visible information:

capturing data representing a second image of visible information, the second image comprising a second plurality of pixels, the second plurality of pixels being represented in the data by color information values;

determining a background color of the second image by finding a first most common color information value among the second plurality of pixels, the background color being represented by a color information value;

determining a set of pixels in the second plurality of pixels within a second threshold of the background color;

translating the data representing the second image to data representing a second translated image by setting the color information value for the set of pixels in the third plurality of pixels to a third color; and determining a fourth color of the first image by finding a second most common color among the second plurality of pixels; and in response to determining that the customer does approve of the visible information:

storing, in a customer authentication database, the data representing the first translated image.

* * * * *

UNITED STATES PATENT AND TRADEMARK OFFICE
CERTIFICATE OF CORRECTION

PATENT NO. : 10,235,619 B2
APPLICATION NO. : 15/874600
DATED : March 19, 2019
INVENTOR(S) : Joshua Edwards et al.

Page 1 of 1

It is certified that error appears in the above-identified patent and that said Letters Patent is hereby corrected as shown below:

In the Claims

Claim 6, Column 27, Line 4, "approval of he visible information" should read --approval of the visible information--.

Claim 12, Column 28, Line 31, "in response to determining that he customer" should read --in response to determining that the customer--.

Claim 18, Column 30, Line 13, "approval of he visible information" should read --approval of the visible information--.

Claim 19, Column 30, Line 20, "in response to determining that he customer" should read --in response to determining that the customer--.

Signed and Sealed this
Ninth Day of July, 2019

Andrei Iancu
*Director of the United States Patent and Trademark Office*